US010691292B2

(12) United States Patent
Lu et al.

(10) Patent No.: US 10,691,292 B2
(45) Date of Patent: Jun. 23, 2020

(54) UNIFIED PRESENTATION OF CONTEXTUALLY CONNECTED INFORMATION TO IMPROVE USER EFFICIENCY AND INTERACTION PERFORMANCE

(71) Applicant: Microsoft Technology Licensing, LLC, Redmond, WA (US)

(72) Inventors: Qi Lu, Bellevue, WA (US); Derrick Leslie Connell, Bellevue, WA (US); Darren Shakib, North Bend, WA (US); William H. Gates, III, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 14/629,214

(22) Filed: Feb. 23, 2015

(65) Prior Publication Data

US 2015/0242091 A1    Aug. 27, 2015

Related U.S. Application Data

(60) Provisional application No. 61/944,033, filed on Feb. 24, 2014.

(51) Int. Cl.
*G06F 3/0481* (2013.01)
*G06Q 30/02* (2012.01)
(Continued)

(52) U.S. Cl.
CPC ........ *G06F 3/04817* (2013.01); *G06F 3/0485* (2013.01); *G06F 3/04842* (2013.01);
(Continued)

(58) Field of Classification Search
CPC ............. G06F 3/04817; G06F 3/04842; G06F 3/0485; G06F 17/30041; G06F 17/30044; G06F 9/451; G06Q 10/10; G06Q 30/0241
See application file for complete search history.

(56) References Cited

U.S. PATENT DOCUMENTS

| 5,715,415 A | * | 2/1998 | Dazey | ................. G06F 3/04895 715/708 |
| 6,563,514 B1 | | 5/2003 | Samar | |

(Continued)

FOREIGN PATENT DOCUMENTS

| CN | 102591657 A | 7/2012 |
| CN | 102592185 A | 7/2012 |

(Continued)

OTHER PUBLICATIONS

Goodnight, Jim, "Socialcast by VMWARE User Guide", Mar. 26, 2013; Available at:http://www.socialcast.com/files/User-Guide.pdf.

(Continued)

*Primary Examiner* — Joy M Weber
(74) *Attorney, Agent, or Firm* — Watson Patents, PLC; Vladan M. Vasiljevic

(57) ABSTRACT

A unified experience environment supports mechanisms that collect and utilize contextual metadata to associate information in accordance with its relevance to a user's current context. An ambient data collector obtains contextual and activity information coincident with a user's creation, editing or consumption of data and associates it with such data as contextual metadata. A context generator that utilizes contextual metadata to identify relationships between data and enable the proactive presentation of data relevant to a user's current context. Proactive presentation includes a context panel that is alternatively displayable and hideable in an application-independent manner and a unified activity feed that comprises correlated data groupings identified by (Continued)

correlation engines, including a universal, cross-application correlation engine and individual, application-specific correlation engines that exchange information through data correlation interfaces. The context panel and unified activity feed enable users to more efficiently access data and increase their interaction performance with a computing device.

19 Claims, 8 Drawing Sheets

(51) Int. Cl.
| | | |
|---|---|---|
| *G06Q 10/10* | (2012.01) | |
| *G06F 16/487* | (2019.01) | |
| *G06F 16/435* | (2019.01) | |
| *G06F 16/48* | (2019.01) | |
| *G06F 3/0484* | (2013.01) | |
| *G06F 3/0485* | (2013.01) | |
| *G06F 9/451* | (2018.01) | |

(52) U.S. Cl.
CPC .......... *G06F 16/435* (2019.01); *G06F 16/487* (2019.01); *G06F 16/489* (2019.01); *G06Q 10/10* (2013.01); *G06Q 30/0241* (2013.01); *G06F 9/451* (2018.02)

(56) References Cited

U.S. PATENT DOCUMENTS

| | | | |
|---|---|---|---|
| 8,086,604 B2 | 12/2011 | Arrouye et al. | |
| 8,621,011 B2 | 12/2013 | Bland et al. | |
| 2003/0107596 A1 | 6/2003 | Jameson | |
| 2006/0075353 A1* | 4/2006 | DeSpain | G06F 17/24 |
| | | | 715/770 |
| 2006/0190833 A1* | 8/2006 | SanGiovanni | G06F 3/04883 |
| | | | 715/767 |
| 2007/0011149 A1* | 1/2007 | Walker | G06F 16/58 |
| 2007/0067737 A1* | 3/2007 | Zielinski | G06F 9/4451 |
| | | | 715/810 |
| 2007/0130170 A1* | 6/2007 | Forney | G06F 17/30286 |
| 2007/0136245 A1* | 6/2007 | Hess | G06F 17/30053 |
| 2007/0266342 A1* | 11/2007 | Chang | G06F 17/30867 |
| | | | 715/810 |
| 2007/0300185 A1 | 12/2007 | Macbeth et al. | |
| 2009/0055739 A1 | 2/2009 | Murillo et al. | |
| 2010/0131523 A1* | 5/2010 | Yu | G06Q 10/107 |
| | | | 707/756 |
| 2010/0293056 A1* | 11/2010 | Flynt | G06F 3/0481 |
| | | | 705/14.58 |
| 2011/0209159 A1 | 8/2011 | Baratz et al. | |
| 2012/0011477 A1 | 1/2012 | Sivadas | |
| 2012/0084214 A1 | 4/2012 | Trier et al. | |
| 2012/0084215 A1 | 4/2012 | Trier et al. | |
| 2012/0151310 A1* | 6/2012 | El-kalliny | G06F 16/9535 |
| | | | 715/205 |
| 2012/0185456 A1* | 7/2012 | Hart | G06F 3/04817 |
| | | | 707/706 |
| 2012/0239663 A1 | 9/2012 | Tzruya et al. | |
| 2012/0296919 A1 | 11/2012 | Sinha et al. | |
| 2012/0331418 A1* | 12/2012 | Bonforte | G06Q 10/107 |
| | | | 715/784 |
| 2013/0014040 A1* | 1/2013 | Jagannathan | G06Q 50/01 |
| | | | 715/765 |
| 2013/0307764 A1 | 11/2013 | Denker et al. | |
| 2014/0108621 A1* | 4/2014 | Bryan | G06F 17/30893 |
| | | | 709/219 |

FOREIGN PATENT DOCUMENTS

| | | | | |
|---|---|---|---|---|
| EP | 2439688 A1 | 4/2012 | | |
| WO | WO 2013/169845 A1 * | 11/2013 | ......... | G06F 3/0488 |

OTHER PUBLICATIONS

Phillips, Laura, "What is Google Now and Why Should I Use It?", Apr. 8, 2013; Available at: http://www.koozai.com/blog/news/industry-news/what-is-google-now-2/.

"Social Format for Business Communications in Bitrix24", Published on: Oct. 15, 2012 Available at: https://web.archive.org/web/20121015150832/http://www.bitrix24.com/features/.

Feng, et al., "Towards Context-Aware Data Management for Ambient Intelligence", In Proceedings of Lecture Notes in Computer Science, vol. 3180, Aug. 30, 2004, pp. 422-431.

"International Search Report & Written Opinion Received for PCT Patent Application No. PCT/US2015/017167", dated May 22, 2015,14 Pages.

"Office Action Issued in European Patent Application No. 15710630.3", dated Aug. 2, 2018, 9 Pages.

"International Preliminary Report on Patentability Issued in PCT Application No. PCT/US2015/017167", dated Mar. 4, 2016, 10 Pages.

"First Office Action Issued in Chinese Patent Application No. 201580010181.9", dated Mar. 5, 2019, 9 Pages.

"Second Office Action Issued in Chinese Patent Application No. 201580010181.9", dated Aug. 15, 2019, 6 Pages.

"Notice of Allowance Issued in Chinese Patent Application No. 201580010181.9", dated Dec. 4, 2019, 8 Pages.

* cited by examiner

UNIFIED PRESENTATION OF CONTEXTUALLY CONNECTED INFORMATION TO IMPROVE USER EFFICIENCY AND INTERACTION PERFORMANCE

CROSS-REFERENCE TO RELATED APPLICATION

This application claims the benefit of U.S. Provisional Patent Application Ser. No. 61/944,033 filed on Feb. 24, 2014.

BACKGROUND

Users of modern computing devices have become accustomed to utilizing multiple different computing devices interchangeably, either to accomplish differing tasks, or in a collaborative fashion to accomplish a single task. For example, users can start composing a word processing document on their desktop computer and then finish composing the document on their tablet computing device. However, the current paradigm is to develop applications for specific computing devices or computing device types and assumes a device-centric world.

Furthermore, a majority of users of computing devices focus on the application programs installed on such computing devices when interacting with, and utilizing, those computing devices. More specifically, users determine a particular task that they desire to perform with the computing device and then further determine which of one or more application programs installed on such a computing device they should select and interact with to accomplish such a task. With the proliferation of operating system platforms that facilitate the purchasing and downloading of application programs, users' application-centric viewpoints are only likely to increase.

SUMMARY

The above-enumerated device-centric and application-centric viewpoints are counter to the notion of computing devices as "digital assistants" and place increased burdens on users, who could accomplish more tasks with their computing devices if such burdens could be reduced or eliminated. Indeed, a true "digital assistant" would provide a single point of interaction for users through which users could accomplish the vast majority of tasks that they sought to accomplish with their computing devices, irrespective of which computing device they utilized to perform such tasks. Users could then begin performing tasks once they determined which task they desire to perform without the need to further determine which of one or more application programs they should select to perform such a task, or on which computing device to perform such a task. Users can, thereby, be freed to act in a more task-focused, rather than an application-focused or device-focused, manner, which users will find more intuitive and less complex.

To facilitate user assistance in a more natural manner, a unified experience environment can support mechanisms that collect and utilize contextual metadata to associate information in accordance with its relevance to a user's current context. The unified experience environment can support an ambient data collector that can obtain contextual and activity information coincident with a user's creation, editing or consumption of data and can associate it with such data as contextual metadata. The unified experience environment can further support a context generator that can utilize contextual metadata to identify relationships between data and enable the proactive presentation of data relevant to a user's current context. Such a proactive presentation can include a context panel that can be alternatively displayed and hidden in an application-independent manner and a unified activity feed that can comprise correlated data groupings identified by one or more correlation engines, including a universal cross-application correlation engine and individual, application-specific correlation engines that can exchange information with one another through data correlation interfaces. The context panel and unified activity feed, either individually or together, enable a user to more conveniently and more efficiently access data that is relevant to the user's current context and increase the user's interaction performance with a computing device presenting such user interfaces by enabling the user to operate within a task-centric paradigm instead of the existing application-specific or device-specific paradigms described above.

DESCRIPTION OF THE DRAWINGS

The following detailed description may be best understood when taken in conjunction with the accompanying drawings, of which.

DETAILED DESCRIPTION

To facilitate a user's performance of tasks with a computing device, a unified experience environment can operate and execute on multiple different types of computing device hardware and can span the multiple types of computing devices that a user would utilize. The unified experience environment is capable of knowing the users, their data, their documents, and is able to provide contextually relevant insights for the user and give the user a way to interact with the device in a contextual manner. The unified experience environment can, therefore, be a device-independent service layer that can be constructed around the user and can provide mechanisms by which a user can interact with a computing device, and receive assistance from the computing device, in the performance of tasks.

Figure 1:
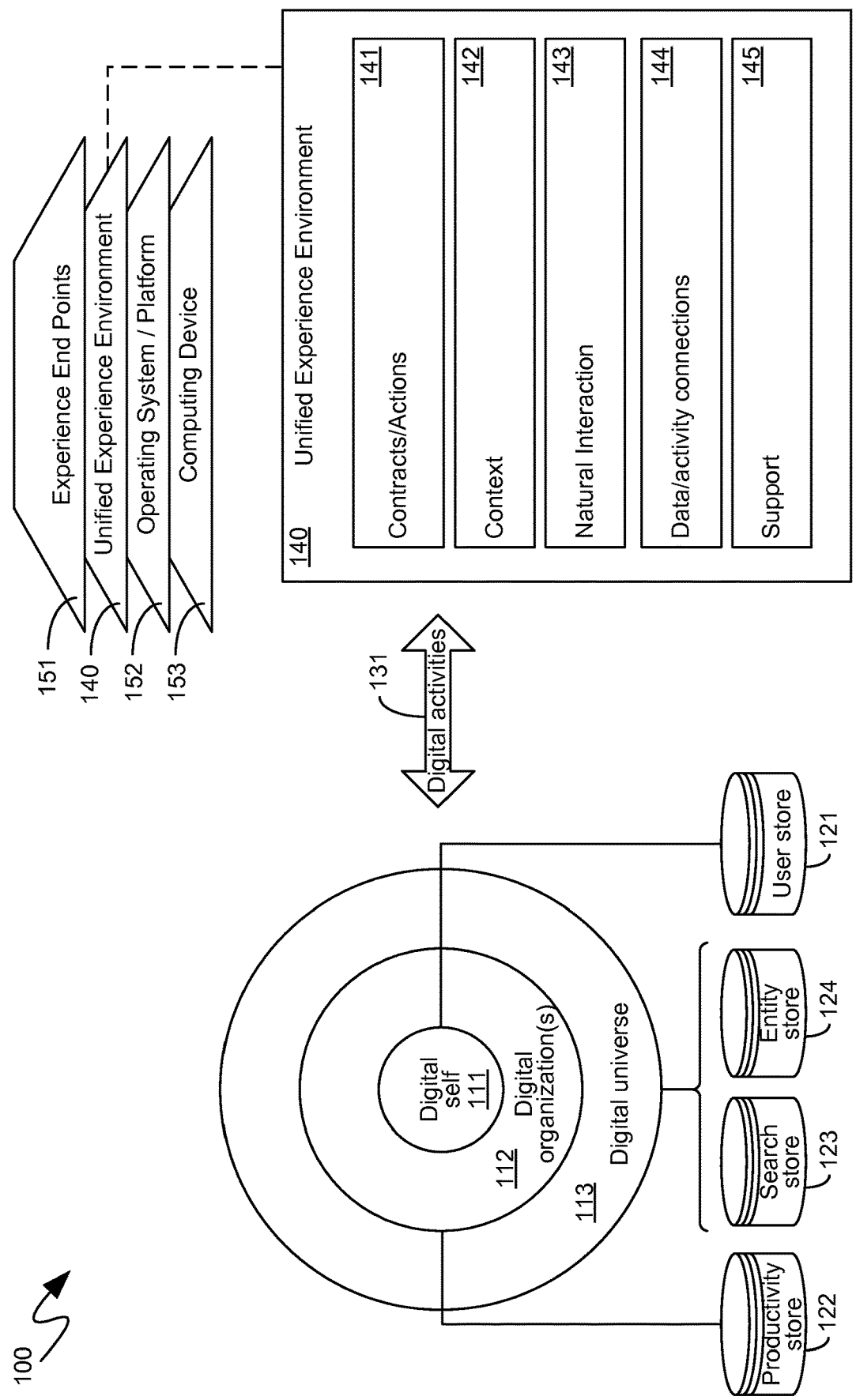
FIG. 1 is a block diagram of an exemplary system for providing unified presentation of contextually connected information.

Turning to FIG. 1, the exemplary system 100 illustrated therein provides context for the descriptions below directed to a unified experience environment, such as the exemplary unified experience environment 140 shown in the exemplary system 100 of FIG. 1. Conceptually, the computer-readable data with which users interact, via computing devices, can be compartmentalized into data relevant to the users themselves, data relevant to groups or organizations to which the user belongs, and other data that the user may, at some point in time, desire to consume or interact with. Graphically, such division of data is illustrated in the form of the circles 111, 112 and 113, where the innermost circle 111 can represent a "digital self", a surrounding circle 112 can represent a "digital organization", and an outermost circle 113 can represent a "digital universe".

The "digital self", such as that conceptually encompassed by the circle 111, can be an amalgamation of the data that can be managed on behalf of a user, such as data retained by a service that the user can access, such as via network communications, from multiple computing devices. Such data includes data generated by the user, which can be stored in a private and secure manner such that it is only accessible by the user, or others to whom the user has given permission. Additionally, such data includes data explicitly or implicitly defined by the user, such as user settings, preferences, locations and the like. Such data, as illustrated in FIG. 1, can be stored in a user store 121, which can represent various storage devices that can be communicationally coupled to computing devices being utilized by the user, in particular storage devices that the user can access through network communications, such as storage devices maintained by a data storage service being utilized by the user to store their data. Similarly, the "digital organization", such as that conceptually encompassed by the circle 112, can be an amalgamation of the data that can be managed, or maintained, on behalf of a defined group of users, such as a corporation, club, organization, or other like group of users, where access to such data is typically limited to only those users within the defined group. As with the "digital self", such data can be retained by a service that members of the group access comma such as via network communications, for multiple computing devices. Such data can include data generated by coworkers within a corporate or business environment, a family members within a family environment, peers within a social networking environment, and the like. As illustrated in FIG. 1, the data from which the "digital organization" is comprised can be stored in a productivity store 122, which can be any storage device or service from which the user would access such "digital organization" data. For example, the productivity store 122 can be a networked document sharing service, a centralized document management system, a distributed document synchronization system, or combinations thereof.

Publically available data can be represented by the "digital universe" that is conceptually encompassed by the circle 113 of FIG. 1. As illustrated, such data is typically accessed through search engines and, as such, can be indexed as part of a search store 123, an entity store 124, or other like database or index. While such data is typically presented through hypermedia documents, it is not so limited and can be any data, sourced externally from the user or groups to which the user belongs, which can be presented to or consumed by the user.

The unified experience environment 140 can facilitate the performance of digital activities 131 that utilize, generate, or consume the data conceptualized by the circles 111, 112 and 113. More specifically, in one embodiment, the unified experience environment 140 can collate and export, or otherwise provide access to, functionality including contracts/actions functionality 141, context functionality 142, natural interaction functionality 143, data/activity connections functionality 144 and support functionality 145.

The contracts/actions functionality 141 can support the various capabilities of application programs, and other like "experience endpoints" through which a user utilizes a computing device, to perform useful actions. As such, the term "contract" can refer to an explicit, or implicit, agreement between a user and an application program or service, namely to define the functionality or features that the application program or service provides to the user. Thus, the contracts/actions functionality 141 can include interfaces, data structures, and computer-executable instructions that can be utilized by experience endpoints to perform actions on behalf of the user, or in response to the user's requests.

The context functionality 142 can represent mechanisms by which the context of a user and the tasks that they are performing is understood in such a manner that the user can be more accurately and more helpfully assisted in the performance of such tasks. The context functionality 142 can include capabilities directed to the capturing of contextual information, including environmental information, and the subsequent utilization of such contextual information. Contextual information that can be captured, and subsequently utilized, can include activities that the user was performing concurrently with the current task, or during a period of time that includes the current task, a time of day that a task was performed, the manner in which the task was performed, and other like contextual information. Environmental information can also provide contextual information and can be part of the context functionality 142. For example, environmental information can include a geographic location of the user at a particular point in time, other users, or other computing devices, that were found to be proximate to the user at that point in time, the hardware status of various computing devices at that point in time, and other like environmental information.

The natural interaction functionality 143 can represent capabilities by which a user's interactions with a computing device can be more human-centric. More specifically, the mechanisms by which users currently interact with computing devices typically comprise interfaces that the user does not use to interact with any other person or thing. The natural interaction functionality 143 can include capabilities to enable users to interact with computing devices in a more human-centric manner, such as by speaking commands, having information spoken back to them, "showing" the computing device images to convey meaning, and others like more human-centric interfaces. As such, the natural interaction functionality 143 can comprise natural language recognition capabilities, as well as the capabilities to communicate back to a user utilizing natural language functionality, optical character recognition functionality by which the content of digital images can be interpreted, and other like capabilities that can facilitate more natural interactions with a computing device.

The data/activity connections functionality 144 can represent those aspects of the user's interaction with the computing device that are transient and not typically retained. More specifically, user interaction with computing devices often includes substantial back-and-forth communications where, typically, it is only the result of such communications that is retained. The data/activity connections functionality 144 can represent capabilities based upon, and directed to, the retention of such back-and-forth interactions between a user and a computing device. For example, the data/activity connections functionality 144 can include the capture and utilization of information such as a user's search history, an ordered listing of the files a user accessed, created or modified, words that the user had auto-corrected, folders or data stores that the user had open for an extended period of time, the user's email viewing history and other like data indicative of transient aspects of the user's interaction with one or more computing devices, including patterns of interaction with different computing devices including, for example, locations where specific computing devices utilized, times of day the specific computing devices utilized, and other like patterns of interaction.

The support functionality 145 can represent logistical functionality including automated backup functionality, error correction and redundancy functionality, performance optimization functionality, hardware support and driver functionality, and other like functionality. As illustrated in the system 100 of FIG. 1, the unified experience environment 140 can be a layer that can execute on one or more operating systems or other like execution support platforms that can facilitate the execution of computer-executable instructions on computing device hardware, and, as such, the unified experience environment 140 can provide the support functionality 145 by amalgamating existing support functionality in the particular operating system on which the unified experience environment 140 is layered with support functionality that can be externally and independently provided.

As illustrated by the layer diagram in the exemplary system 100 of FIG. 1, the unified experience environment 140 can be a layer between an operating system/platform layer 152 and an experience endpoints layer 151 that can comprise application programs, hypermedia documents and other like mechanisms with which a user directly interacts. In one embodiment, the unified experience environment 140 is operating system and platform independent and is designed to execute on any computing device hardware. Thus, the computing device layer 153 can include various different types of computing devices, such as laptop computing devices, desktop computing devices, smartphone computing devices, tablet computing devices, and smart wearable devices, such as smart watches, smart glasses, smart sensors, and the like, and can include both dedicated-use computing devices, and general-purpose computing devices. Analogously, the operating system/platform layer 152, providing support for the unified experience environment 140, can include any operating system and platform providing the relevant execution support, including multiple ones of the operating systems and platforms that are most commonly utilized.

Illustrative, but strictly exemplary, aspects of the functionality of the unified experience environment 140 can be described by reference to exemplary common tasks performed by users with computing devices. For example, a user performing note taking tasks on their computing device can be aided in such tasks by the mechanisms supported by the unified experience environment 140. The natural interaction functionality 143 can enable the user to take a photograph and have information from the photograph recognized on the user's behalf. Thus, for example, if the user were to see a printed advertisement for an event that was of interest to the user, the user could simply take a photograph of such a printed advertisement, and the natural interaction functionality 143 could recognize relevant aspects of such a printed advertisement, such as, for example, that the printed advertisement contained text specifying a particular date and time and a particular place for the event. Similarly, the contextual functionality 142 could recognize that the printed advertisement was for an event, as opposed to, for example, for a product or a service. Consequently, by simply taking a photograph of the printed advertisement, the user could have relevant information automatically entered into their computing device, such as a calendar event for a particular date and time and specifying a particular location.

As another example, a user performing content creation tasks on their computing device can be aided in such tasks by the mechanisms supported by the unified experience environment 140. For example, the data/activity connections 144 can include recent searches on a particular topic, which, in combination with the contextual functionality 142 can be utilized to identify the specific project on which the user is currently focused without requiring the user to explicitly identify such a project, or even ever explicitly delineate such a project as a category or construct by which to organize or categorize information. With such contextual information, automatically derived, mechanisms can be automatically invoked to aid the user in the relevant content creation. For example, when a user attempts to create a new word processing document, a template for documents associated with the specific project can be automatically invoked based upon the recognition that the user was likely currently focused on such a project.

By aggregating information from previously disparate sources, as well as information that previously was simply discarded or ignored, the unified experience environment 140 can enable users of computing devices to focus on task completion, as opposed to application program interfaces, and can, thereby, enable such users to be more productive and complete more tasks more quickly. The scope of assistance that can be provided by the unified experience environment 140 can be far-reaching. By way of example, a user can receive an email from a colleague notifying the user that a part in a device being designed by the user's company is failing. Should the user identify a replacement part in a foreign country, and initiate an audio or video communication with a supplier of such a part, the unified experience environment 140 can support mechanisms by which the language of such a supplier can be automatically recognized and computer-translation can be automatically applied such that, during the audio or video communication, each party can speak in their native language and have their communications automatically translated.

Similarly, continuing with the above example, when the user communicates their findings back to their co-worker and suggests having a meeting with the rest of the team, the unified experience environment 140 can support mechanisms by which the identity of the project and, thereby, the identity of the relevant team and its membership, is automatically recognized, an available conference room at the time referenced by the user is automatically identified, and the meeting invitation is automatically generated on the user's behalf. When the user enters such a conference room, the unified experience environment 140 can support mechanisms by which the presence of video presentation equipment can be automatically recognized and communicationally coupled with the user's computing device such that presentation can be commenced immediately. Additionally, the unified experience environment 140 can support mechanisms by which the presence of the user's coworkers can be detected and, based upon keywords in the meeting invitation, and the coworkers present, the relevant documentation can be made available to the user without the user having to explicitly search for it.

As illustrated by the above descriptions and examples, the unified experience environment 140 can support a more natural, task-focused interface between a user and any computing device the user seeks to utilize. In one embodiment, the unified experience environment 140 can support the automatic presentation of information that is relevant to a task that the user is currently performing, including automatically selecting and presenting, to the user, various suggestions, documents, events, communications, entities, other users, collections, and any other data that can aid the user in the performance of the task they are currently focused on. In another embodiment, unified experience environment 140 can support the automatic organization, collation and presentation of information to a user, thereby automatically organizing all of the user's digital life, including documents, events, communications, entities, other users, collections, and any other data generated by, collected by, utilized by, or otherwise associated with the user. In so doing, the unified experience environment 140 can abstract away conventional hierarchical data organization interfaces, enable the user to access the relevant data and the relevant functionality of the user's computing device, without explicitly having to organize and then subsequently find such data, and without having to explicitly install, manage, and select one or more application programs comprising computer-executable instructions for implementing such functionality.

Figure 2A:
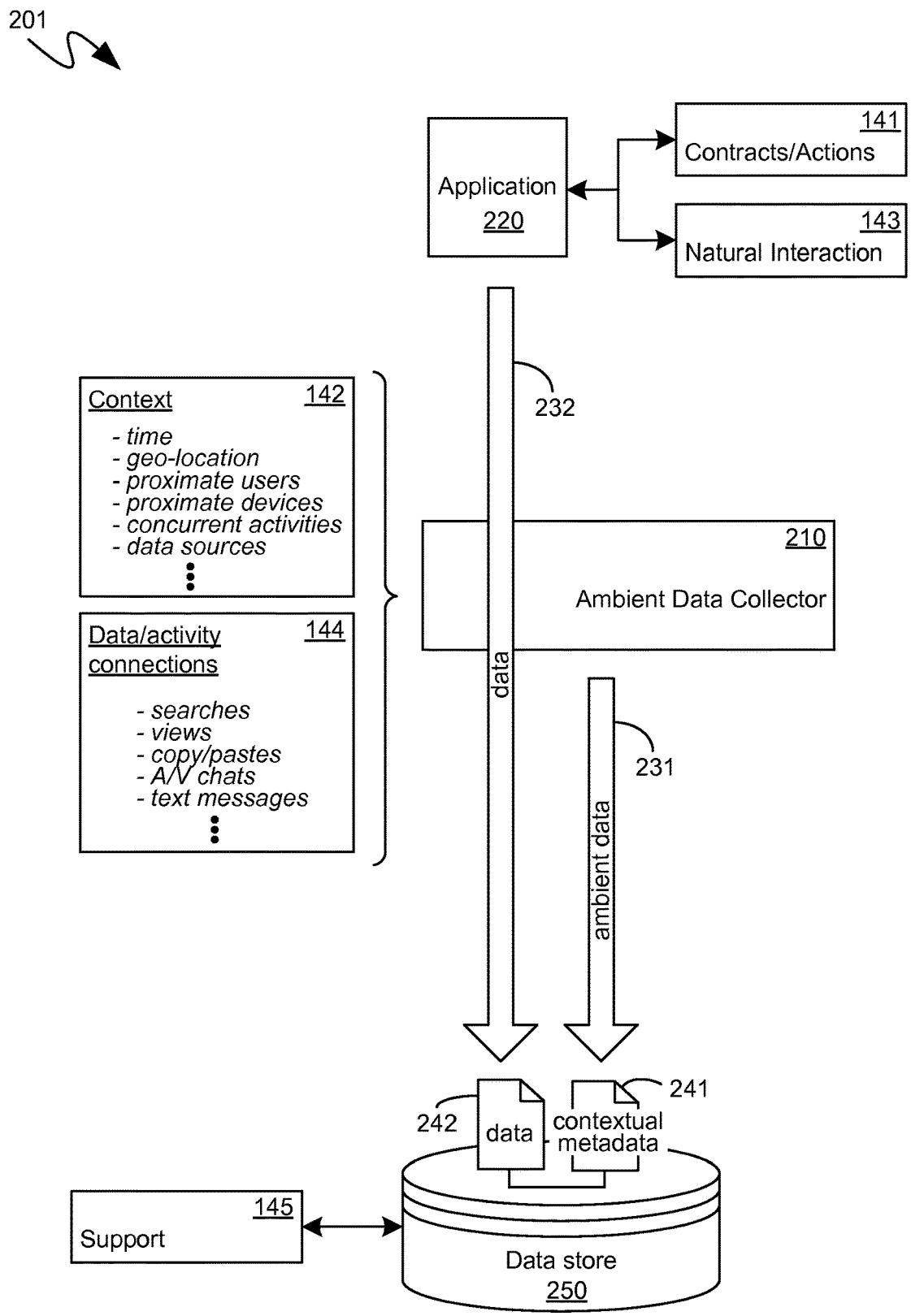
FIGS. 2a and 2b are block diagrams of exemplary components for acquiring contextual metadata and using acquitted contextual metadata, respectively, to support a unified presentation of contextually connected information.

Turning to FIG. 2a, the exemplary system 201 illustrates one embodiment by which contextual information can be retained for subsequent utilization, such as to facilitate the above described mechanisms and functionality. As shown, the exemplary system 201 of FIG. 2a can comprise an ambient data collector component 210 that can collect and retain ambient data, such as exemplary ambient data 231. "Ambient data" is data regarding the environment within which a data-generating, or data-modifying event occurs. As will be described in further detail below, "ambient data" includes both data regarding the physical environment, such as a current time, geographic location, users, devices, or entities that are physically present and other like physical environmental attributes, as well as data regarding the computing environment, such as activities that were being performed concurrently on the computing device, related actions by the user, such as searches the user performed, documents the user opened, text messages the user exchanged, and other like computing environment aspects. An application program, such as exemplary application 220, can generate data, such as exemplary data 242, and can store such data on a data store, such as exemplary data store 250, as illustrated by the arrow 232. The exemplary application 220 can be any data-creating and/or data-consuming application, including content creating applications, such as word processors and spreadsheet applications, as well as digital image editing applications, social networking applications, email or personal information management applications, relational database application, and any other data-creating or data-organizing application. The exemplary application 220 can make available, to a user, capabilities that are supported by the contracts/actions functionality 141 and the natural interaction functionality 143 of the unified experience environment that was described in detail above. Similarly, the data store 250, which can represent any hardware data storage, or software-based data storage service, can be supported by the support functionality 145 of the unified experience environment.

In one embodiment, an ambient data collector component, such as the exemplary ambient data collector 210, can, pending the user's approval, generate ambient data and can store such ambient data, as illustrated by the arrow 231, with the data 242, on the data store 250, in the form of associated contextual metadata 241. More specifically, in one embodiment, an ambient data collector component, such as exemplary ambient data collector 210 can interface with, or be a part of, the context functionality 142 of the unified experience environment described previously. Similarly in one embodiment, either in addition to the context functionality 142, or as an alternative, the ambient data collector 210 can also interface with, or be a part of, the data/activity connections functionality 144. As part of the context functionality 142, the ambient data collector 210 can have access to ambient data such as, for example, the time at which the application 220 is generating the data 242, the geographic location of the computing device on which the application 220 is executing, or the computing device through which the user is interacting with the application 220, if the application 220 is executing remotely from the user, to cause it to generate the data 242, one or more users that may be proximate to the user at the time the data 242 is being generated by the application 220, devices that may be proximate to the user at that time, any activities that the user may have been performing concurrently, or near in time, such as searches or other data consumption or creation actions, data sources that the user, or the application 220, may have accessed as part of the generation of the data 242, and other like ambient data. Similarly, the ambient data collector 210 can, as part of the data/activity connections functionality 144, have access to ambient data such as searches that the user may have performed in connection with the application 220 generating the data 242, data or information that the user may have viewed in connection with the generation of the data 242, any data sources from which portions of the data 242 may have been copied or pasted, communications, such as chats, text messages, audio communications, video communications and the like that the user may have engaged in concurrently with the generation of the data 242, and other like ambient data.

In addition, in one embodiment, the ambient data collector 210 can obtain data from other computing devices that are also being utilized, either concurrently or at differing times, by the same user. For example, the context functionality 142 can provide indicia of the fact that, for example, the user's tablet computing device is proximately located to the user's laptop computing device, and the data/activity connections 144 can further provide indicia indicating that while the user was, for example, editing a presentation with the application 220 on the user's laptop computing device, the user was simultaneously engaging in, for example, a video chat on the user's tablet computing device. In such an example, information regarding such a video chat on the user's tablet computing device can be part of the contextual metadata 241 that can be stored by the ambient data collector 210 executing on, for example, the user's laptop computing device. In yet another embodiment, the ambient data collector 210 can be executing on a networked computing device hosting a service through which the user was performing one or both of: editing the presentation on the user's laptop computing device and/or engaging in the video chat on the user's tablet computing device.

As indicated, a user can be provided with control regarding the sort of ambient data that the ambient data collector 210 can collect. Such control can be generalized, such as alternatively allowing, or not allowing, ambient data to be collected and stored. Alternatively, such control can be specific, thereby enabling a user to delineate which types of ambient data can be collected, where such collected ambient data can be stored, and under what conditions such ambient data can be utilized, such as by the context generator 260, described in detail below. Additionally, the user can be provided with notifications when ambient data is being collected, or with notifications generally indicating that the user is agreeing to enable ambient data collection.

In one embodiment, the ambient data collector 210 can filter the collected ambient data and can select a subset thereof to be retained as the contextual metadata 241 that is associated with the data 242. In such an embodiment, the filtering of collected ambient data can be based on predetermined criteria that can be indicative of the relevance of collected ambient data. For example, if the data 242 is part of a word processing document, then searches that the user may have been performing concurrently with the storage of the data 242 may have greater relevance while, as another example, if the data 242 is part of a photograph that the user has taken, then the user's geographic location or other users or proximate to the user can be more relevant ambient data. In another embodiment, the ambient data collector 210 can retain all of the ambient data that it is able to collect without filtering such data prior to storage on the data store 250.

As illustrated by the exemplary system 201 of FIG. 2a, some or all of the ambient data collected by the ambient data collector component 210 can be stored as the contextual metadata 241 that can be associated with the data 242. Although illustrated as separate files or like data collection constructs, in another embodiment, the contextual metadata 241 can be stored as part of the file containing the data 242. Additionally, the contextual metadata 241 can be retained in various forms and formats including, for example, name/value pairs, extensible markup language defined values, a tabular, or database structure, and other like forms.

Figure 2B:
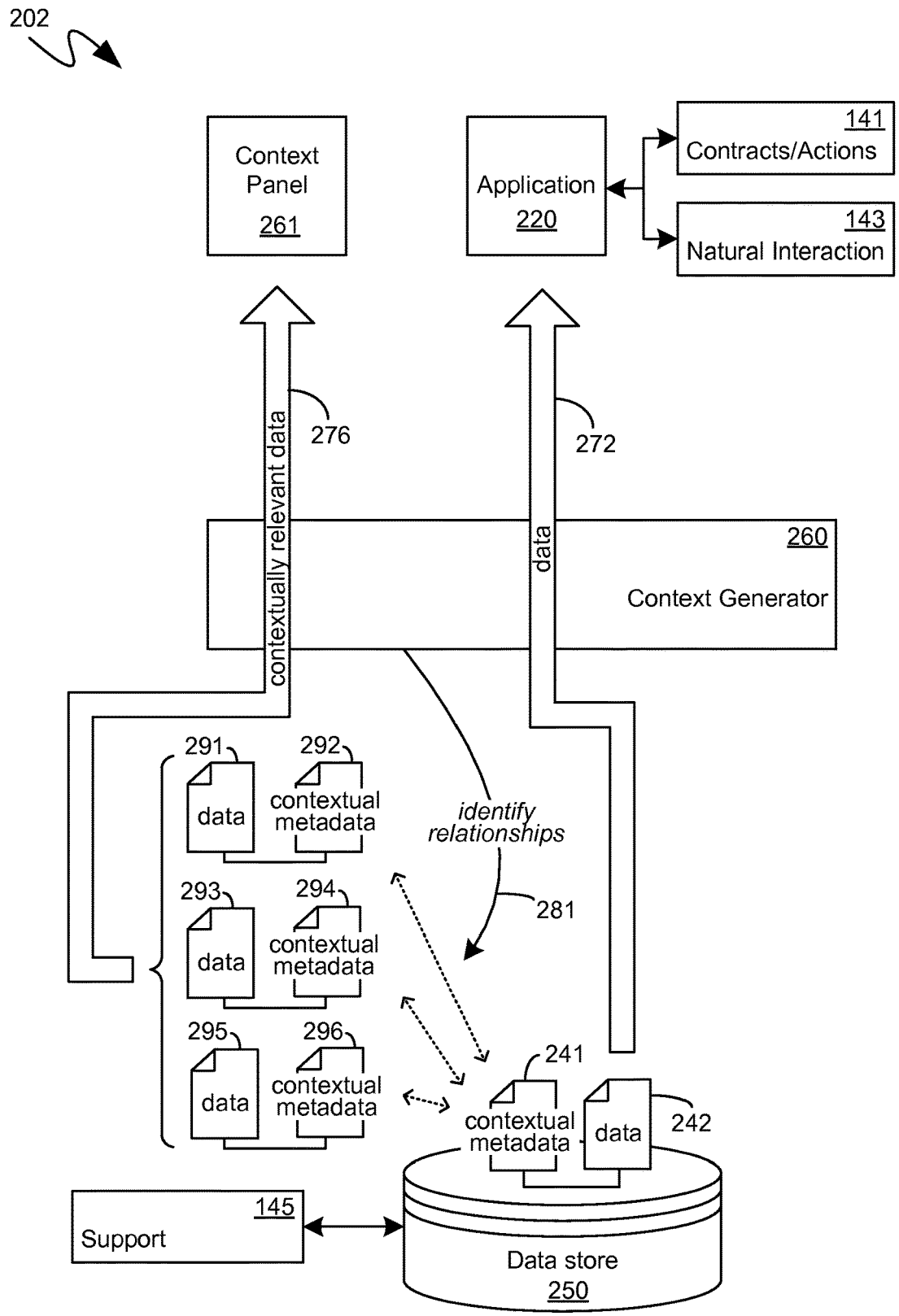

Turning to FIG. 2b, the exemplary system 202 shown therein illustrates exemplary mechanisms by which the contextual metadata 241, generated and stored by the ambient data collector component 210, can be subsequently utilized, such as by the exemplary context generator component 260 shown. More specifically, the application 220 can read data, such as the exemplary data 242, from the data store 250, as illustrated by the arrow 272. As indicated previously, the application 220 can be any data-consuming and/or data-creating application and can be supported by the contracts/actions functionality 141 and the natural interaction functionality 143 of the unified experience environment. Similarly, the data store 250 can, as before, be supported by the support mechanisms 145 of the unified experience environment.

In one embodiment, the reading of the data 242, by the application 220, as illustrated by the arrow 272, can trigger a contextual metadata consuming component, such as the exemplary context generator 260, shown in FIG. 2b, to utilize the contextual metadata 241 that is associated with the data 242 that was read by the application 220, and identify relationships, as illustrated by the identify relationships action 281, between such contextual metadata 241 and one or more other collections of contextual metadata, such as the exemplary contextual metadata 292, 294 and 296. The relationships between the contextual metadata 241 and other contextual metadata, such as the exemplary contextual metadata 292, 294 and 296, can be based on identified similarities, or equivalencies, such as shared aspects, between the contextual metadata 241 and the contextual metadata 292, 294 and 296. For example, each of the contextual metadata 241, 292, 294 and 296 can comprise contextual information indicating that the user was the same geographic location, such as the user's office, when the data corresponding to such contextual metadata was generated. As another example, each of the contextual metadata 241, 292, 294 and 296 can identify that the same collection of other users were proximate to the user when the data corresponding to such contextual metadata was generated. In another embodiment, the relationships between the contextual metadata 241 and other contextual metadata can be based on heuristic analysis to identify commonalities or similarities between. For example, the user can have been scheduled in meetings directed to a common topic during the time when the data associated with the contextual metadata 292, 294 and 296 were generated.

In yet another embodiment, reference to existing identified relationships can be utilized as part of the identify relationships action 281. Thus, for example, if mechanisms supported by the unified experience environment have identified that the user is working on a business project to redesign a given part, and have generated a collection of files, or other like data constructs, associated with such a project, the identify relationships action 281, performed by the context generator component 260, can take such existing structure and correlations into account when determining which of the data associated with the contextual metadata 292, 294 and 296 is related to data 242 that is associated with the contextual metadata 241. Another existing relationship that can inform the identification of relationships action 281 can be the relationship among computing devices based on the computing devices each having been utilized by a common user. Thus, for example, if a user owns a smartphone computing device, a tablet computing device, a laptop computing device, and an in-car computing device, then the user's actions on any one or more of those computing devices can serve as input from which contextual metadata, such as the contextual metadata 242, 292, 294 and 296 was generated. Furthermore, the user's actions on any one or more of those computing devices can further server as the impetus behind the identification of relationships among the contextual metadata 242, 292, 294 and 296, as illustrated by the identify relationships action 281.

Each of the contextual metadata 292, 294 and 296, which can have been identified to have a relationship with the contextual metadata 241, can be associated with one or more collections of data, such as exemplary data 291, 293 and 295, respectively. Therefore, in one embodiment, a context panel, such as the exemplary context panel 261, or other like user-facing functionality, can be invoked by the user and, in response to such an invocation, the data 291, 293 and 295 that is associated with the contextual metadata 292, 294 and 296 that was deemed related to the contextual metadata 241, can be provided to the context panel 261 by the context generator component 260, as illustrated by the arrow 276. In such a manner, data determined to be contextually related to the data associated with the task the user is currently performing, such as, for example, the data 242 that was read by the application 220, can be made available to aid the user in the performance of such a task. For example, the contextually relevant data that can be made available to the user, such as via the context panel 261, described in detail below, can include documents, images, email messages, schedule events, individuals, entities, social media postings, collections and any other like data.

Figure 3:
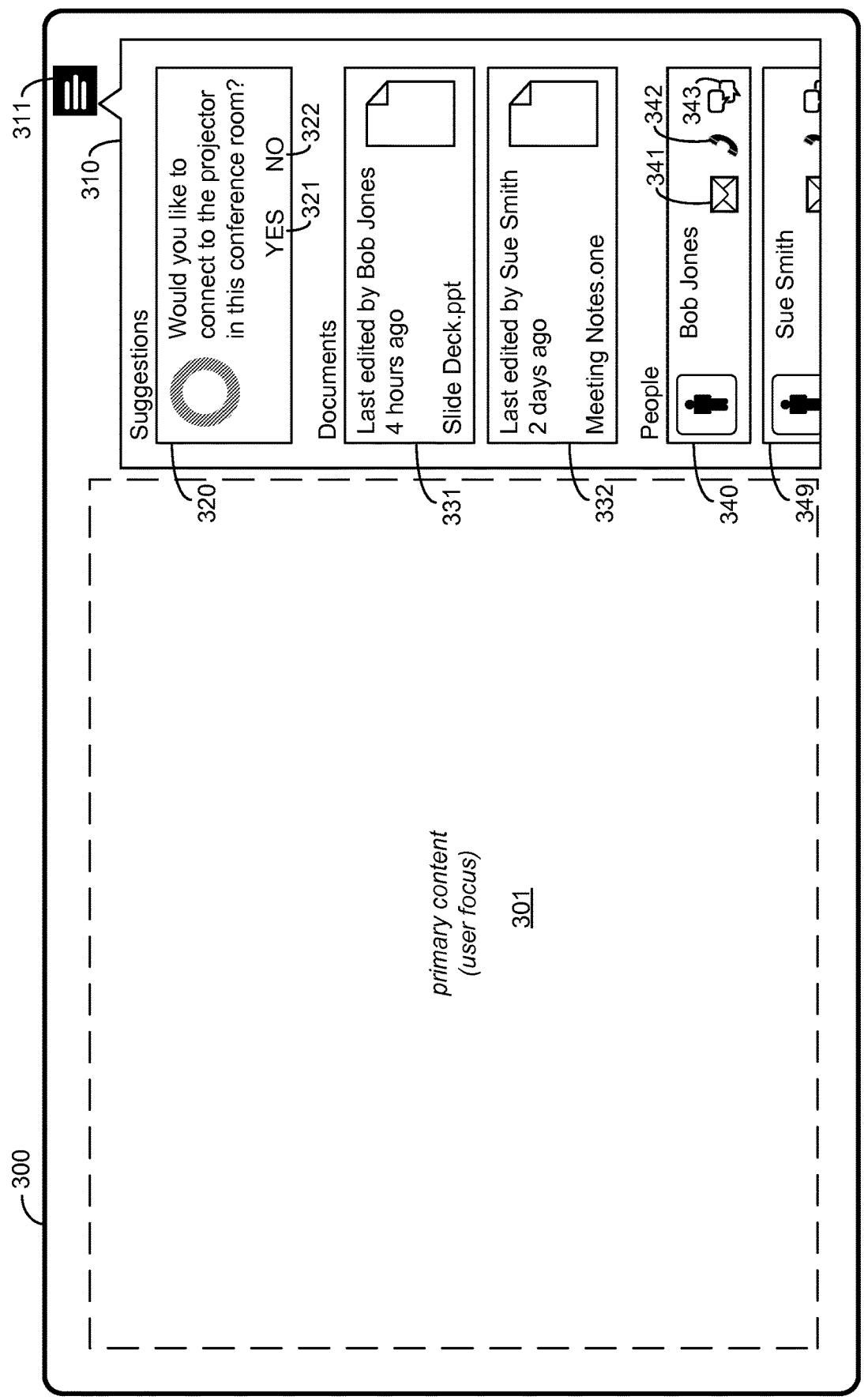
FIG. 3 is a diagram of an exemplary user interface providing unified presentation of contextually connected information.

Turning to FIG. 3, the exemplary user interface 300 shown therein illustrates exemplary embodiment by which contextually relevant data can be presented to a user to aid in the performance of tasks. In the embodiment illustrated in FIG. 3, contextually relevant data can be presented within a context panel 310 which can be, alternatively, displayed and hidden by the user, such as via the user interface element 311. Within the exemplary user interface 300 of FIG. 3, the task being performed by a user can be performed as part of the primary content area 301. Thus, for example, if the user was editing a word processing document, such a textual document could be displayed within the primary content area 301. The context panel 310 can then present contextually relevant information that can aid the user in, for example, editing the word processing document. In such an example, the context panel 310 could present documents, such as other textual documents, photographs, audio recordings, videos, emails or other like documents that are related to the textual document that user is currently editing, such as by being directed to the same topic. The context panel 310 can also present other data deemed contextually relevant to the document the user is currently editing such as, for example, contact information for people related to the project or topic to which the document is directed, prior meetings at which the content of the document appears to have been discussed, email messages containing keywords or other indicia indicating their association with the document being edited.

In one embodiment, the context panel 310 can be interactive. For example, the information presented therein can be acted upon by the user to perform other actions, such as generating a meeting invitation, sending a text message, or searching for an image. As another example, the user can add content to the context panel 310 such as, for example, by dragging such content from the primary content area 301 into the context panel 310. Similarly, the user can obtain content from the context panel 310 to include with the task the user's currently performing in the primary content area 301. Thus, for example, if the context panel 310 contained a collection of documents relevant to the document currently being edited, the document currently being edited could be saved with, or at least associated with, that collection of documents by simply dragging from the primary content area 301 to the context panel 310. As another example, if the user was editing a document in the primary content area 301 and needed to include an image from a relevant presentation that was created by one of the users coworkers, the user could find such a presentation already presented to them in the context panel 310, such as the presentation represented by the tile 331 in the exemplary context panel 310 shown in FIG. 3. The user could then open such a presentation directly from the context panel 310. As yet another example, if the user needed to include an image or a graph in the document the user is editing the primary content area 301, such an image or graph could be one of the documents presented in the context panel 310, and the user could simply drag such an image or graph directly from the context panel 310 into the document being edited in the primary content area 301. In such a manner, the context panel 310 can proactively provide, to the user, information and data contextually relevant to the task the user is performing, which the user can have immediately available to them, thereby enabling the user to perform their task more efficiently and remain task-focused, as opposed to being distracted by trying to find the information they desire.

As yet another example of the utility of a context user interface element, such as exemplary context panel 310, a user entering a conference room to begin a meeting can open a document, such as in the primary content area 301, which the user desires to present as part of the meeting. The user's location, the identity of other users proximate to such a user, the user's calendar, indicative of a meeting at the current time, and other like environmental data can correlate the document currently open in the primary content area 301 with other meeting-related, or project-related, collections of data and such documents and collections of data can be waiting for the user in the context panel 310, which, as indicated previously, the user can alternatively trigger the display of, or the hiding of, the at the exemplary user interface element 311. The identification of documents or other related content can be in the form of the tiles, such as the exemplary document tiles 331 and 332 illustrated in FIG. 3. Should the user desire to present one of the documents identified by the tiles 331 and 332 during the presentation, the user need not waste any time in finding such documents since, in one embodiment, access to such documents can be obtained directly through the context panel, such as by clicking on, touching, selecting or otherwise activating the appropriate tiles, or otherwise directing user action thereto.

In one embodiment, a context panel, such as the exemplary context panel 310, can comprise active suggestions to the user, including suggestions for the performance of other tasks. For example, as illustrated in exemplary user interface 300 of FIG. 3, the user can be presented with suggestions, such as via the suggestion tile 320, by which the user can be suggested to, for example, instruct the computing device to establish communicational connection with the projector in the meeting room in which the user is currently located. Such suggestions can, in one embodiment, remain in the context panel 310, and can then be removed when is determined that they are no longer relevant. In another embodiment, the user can be provided with explicit selection or decline options, such as the exemplary options 331 and 332. In such an embodiment, user action directed to such suggestions can be yet another source of information for tuning the mechanisms that select which suggestions to surface to the user.

In one embodiment, a context panel, such as the exemplary context panel 310, can comprise identifications of any data that can be relevant to a user in performing their current task including, for example, events, collections, photographs, audio recordings, webpages, social network feeds, text messages, entities, individuals, and any other like data. For example, the exemplary context panel 310 is shown in FIG. 3 as comprising presentation of individual people, such as illustrated by the exemplary tiles 300 and 349, that can have been determined to be related to the task being performed by the user in the primary content area 301. As indicated previously, in one embodiment, the context panel 340 can be interactive and, as such, identifications of people, such as via the exemplary tiles 340 and 349 can include communicational options, such as the communication options 341, 342 and 343, selection of which can trigger a communication to be directed to the targeted person via the selected communication vector directly from the context panel 310.

A context panel, such as the exemplary context panel 310, can provide the user with information, notifications and options that are deemed to be contextually relevant the task the user is currently performing, thereby enabling the user to perform such a task more efficiently. In another embodiment, contextual groupings of documents, notifications, emails, people, photos, meetings, social network feeds, text messages, entities, individuals, web content, services and other like data can act as a default interface through which a user interacts with their computing device and accesses the functionality provided by application programs accessible to the user through such a computing device. More specifically, mechanisms supported by the unified experience environment can proactively organize and continually update digital content for the user to enable the user to focus on tasks rather than the organization of content.

Figure 4A:
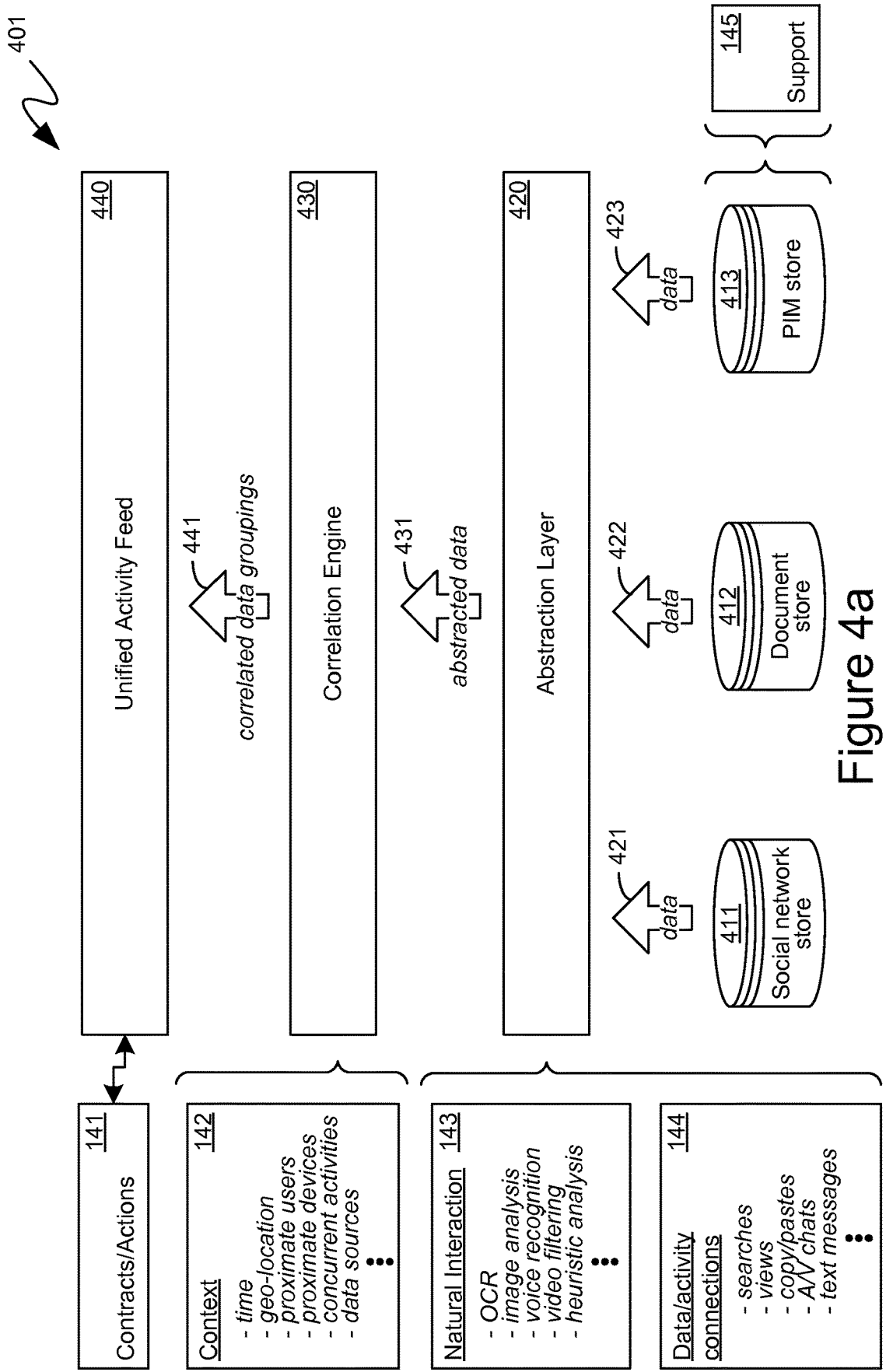
FIGS. 4a and 4b are block diagrams of exemplary components for providing a unified presentation of contextually connected information

Turning to FIG. 4a, the exemplary system 401 shown therein illustrates an exemplary embodiment for organizing and presenting content in accordance with determined relevance and interrelationships. Initially, content to be made available to the user can be stored across multiple, independent and disparate stores or repositories. Thus, in the exemplary system 401, a social network store 411, document store 412 and personal information manager store 413 are illustrated by way of example. More specifically, the social network store 411 can represent the data and content, relevant to a user, that can be stored by, and accessed through, existing social network mechanisms, such as network-based social networking services. Similarly, the document store 412 can represent the documents created by, edited by or relevant to a user, that can be stored by, and accessed through, a collaborative document management and sharing platform, and the personal information manager store 413 can represent the emails, meetings, calendar events, notes and other like data that can be created by, stored by and accessed through a personal information manager, such as an email program.

Traditionally, users would be required to utilize different application programs to access the data in, for example, social network store 411, document store 412 and personal information manager store 413. Thus, the user would not be task-focused, but rather would be application-focused, as they would need to identify, locate and invoke the correct application before being able to access the data in one or more of various different data repositories such as, for example, the exemplary social network store 411, the document store 412 and personal information manager store 413 shown in the system 401 of FIG. 4a. By contrast, in one embodiment, an abstraction layer, such as the abstraction layer 420, can be supported by the functionality made available via the unified experience environment, and can abstract data from multiple different sources into a single abstracted data 431 that can then be correlated together into groupings or collections for more elegant and efficient presentation to a user, thereby enabling a user to remain task-focused rather than application-focused.

In one embodiment, an abstraction layer, such as the exemplary abstraction layer 420, can interface with one or more data stores, such as the exemplary social network store 411, document store 412 and personal information manager store 413, and extract therefrom data in a native format, such as a format in which it is retained by such stores. Thus, as illustrated by the exemplary system 401 of FIG. 4a, the exemplary abstraction layer 420 can obtain data 421 from the social network store 411, data 422 from the document store 412 and data 423 from the personal information manager store 413.

In addition, in one embodiment, the abstraction layer 420 can also obtain data from the data/activity connections functionality 144 of the unified experience environment. As illustrated in FIG. 4a, and as described previously, the data/activity connections functionality 144 can make available, to the abstraction layer component 420, additional information that can become part of the abstracted data 431, such as, for example, prior searches that the user performed, documents, webpages or other like collections of data that the user viewed, transcripts of communicational exchanges, such as A/V chats, text messages the user center received, content the user copied or pasted, and other like data that is not typically saved as part of any other data store.

With such information, the abstraction layer component 420 can then abstract the data it has obtained, such as the data 421, 422 and 423, into a common abstracted data 431, which can, in one embodiment, utilize a common format. Such a common format can include, for example, data structures for retaining environmental or contextual metadata, such as that described in detail above. Additionally, such a common format can include data structures by which original data can be retained while generated metadata can also be included and retained therewith.

For example, the data 421, from the social network store 411, can include pictures generated by the user or by other users that are associated with the user through the social network. In one embodiment, the abstraction layer component 420 can utilize the natural interaction functionality 143, provided by the unified experience environment, to perform optical character recognition or other image analysis to generate metadata from such pictures. For example, image analysis can be performed to identify the faces of the individuals shown in the pictures. Is another example, optical character recognition can be utilized to detect textual content in the pictures such as, for example, street signs, building names, and other like data that can be useful for subsequently correlating the pictures with other related data. Such metadata, which can be generated by the abstraction layer component 420, can be part of the abstracted data 431, as can the original pictures that can have been part of the data 421 that was obtained from the social network store 411.

As another example, the data 422, from the document store 412, can include textual documents, such as word processing documents, that were generated by the user or which are otherwise associated with the user. In one embodiment, the abstraction layer component 420 can utilize the natural interaction functionality 143 to perform heuristic analysis of such documents to identify documents directed to a common topic. For example, returning to the above examples where the user is designing a part, the heuristic analysis, such as that provided by the natural interaction functionality 143, can look for references to part design, part components, specific part nomenclature, and other like heuristic cues, by which metadata can be generated identifying the topics of one or more of the documents that can be part of the data 422, obtained from the document store 412, by the extraction layer component 420. The abstraction layer component 420 can then save such generated metadata, such as, for example, based on heuristic analysis, together with the documents themselves, as part of the abstracted data 431.

In one embodiment, generation of the abstracted data 431, such as by the abstraction layer component 420, can comprise the reformatting data into a more generalized, or abstracted form. For example, a word processing document, received as part of the data 422, from the document store 412, can be saved, as the abstracted data 431, in a format that includes the original word processing document, but also includes only the textual content of such a document, independent of any formatting, or application-specific annotations and information intertwined with such textual content in the word processing document itself. In such a manner, the abstracted data 431 can be easier for a correlation engine, such as the exemplary correlation engine 430, to parse and correlate into data groupings.

As the abstraction layer component 420 generates the abstracted data 431, a correlation engine component, such as exemplary correlation engine component 430, can correlate such data into the correlated data groupings 441. In one embodiment, the correlation engine component 430 can reference metadata, which is saved as part of the abstracted data 431, to identify correlations among the abstracted data 431. For example, metadata indicating the presence of specific keywords in each of several word processing documents can be utilized by the correlation engine 430 to determine that each of such word processing documents is directed to a common topic and, consequently, that such word processing documents are to be part of a correlated data grouping, such as exemplary correlated data groupings 441, encompassing such a common topic. As another example, metadata indicating that a document was created during a meeting with another user can be utilized by the correlation engine 430 to generate a correlated data grouping comprising the document as well as the meeting notification and such other user's information, which can have been obtained, for example, as part of the data 423, from the personal information management store 413.

The correlated data groupings 441 can comprise any of the data, originally obtained by the abstraction layer 420, into a single grouping. Thus, for example, a grouping encompassing a trip the user took with their friends can include email messages exchanged regarding such a trip, photographs posted on social networking sites from such a trip, the itinerary of the trip, as can have been obtained from an online travel service, the contact information of the friends that accompanied to the user on the trip, a spreadsheet maintaining trip costs, searches the user performed in connection with the trip, and other like data. As can be seen, the correlated data groupings are not limited to a specific type or format of data, but rather encompass all data that can be conceptualized as being part of a specific topic or task. In such a manner, the correlated data groupings 441 can be more intuitive for users. More specifically, users typically associate content with the context within which such content was generated. Thus, to a human user, a photograph taken on a trip is associated with the itinerary of the trip. Conversely, to currently existing computing processes, such a photograph would the accessible through a digital image organization application program, while the itinerary of the trip would be accessible through an online travel service, such as that accessed through a web browser application program. As such, currently existing computing processes force a user to introduce artificial barriers between data that the user otherwise conceptualizes as being related. To that end, the correlation engine 430 seeks to generate correlated data groupings 441 that group together the data that a user would conceptualize as being related.

In one embodiment, the correlation engine 430 can utilize context functionality 142, such as that provided as part of the unified experience environment described above. As illustrated in FIG. 4a, context functionality 142 can enable the correlation engine 430 to obtain and reference information such as the time when one or more sets of data were created or modified, the geographic location of the user when such data was created or modified, other users or devices that were proximate to the user when such data was created or modified, other activities that the user may have been engaging in at approximately the same time when the data was created or modified, or other like environmental or contextual information that can further enable the correlation engine 430 to identify correlations among the data.

In one embodiment, the correlation engine 430 can generate correlated data groupings 441 based on an initial pass through the abstracted data 431. A subsequent pass can then be utilized to determine whether the correlated data groupings can be subdivided further, or, conversely, whether two or more correlated data groupings are to be combined together. In identifying, and creating, data groupings the correlation engine 430 can utilize heuristic analysis to distinguish between, for example, a user's vacation to one foreign country versus that user's business trip to another foreign country, or to distinguish between the user's friends and the user's family. Additionally, as new data is obtained by the abstraction layer component 420, the correlation engine can continually reevaluate its groupings, or collections of data, and can subdivide groupings, or combine multiple groupings together, as appropriate in light of newly received data.

Once the correlation engine 430 has generated a set of the correlated data groupings 441, they can be provided to a unified activity feed component 440. In one embodiment, the unified activity feed component 440 can determine an ordering or ranking of the correlated data groupings 441 and can generate presentations of such correlated data groupings 441, to the user, via the user interface hardware that is present on whatever computing device the user is currently utilizing. In an alternative embodiment, such ranking can be performed by the correlation engine component 430.

To enable a user to access their data from any computing device, the unified activity feed component 440 can be implemented in a cross-platform manner such that a user can be presented with equivalent sets of correlated data groupings whether the user is utilizing, for example, their desktop computing device, their tablet computing device, their smartphone computing device, their integrated automobile computing device, or any other dedicated or general purpose computing device. Additionally, the unified activity feed component 440 can continuously reorder the presentation of the correlated data groupings 441 based upon changes to the underlying data such as, for example, new documents being saved in the document store 412, new email messages arriving in the personal information management store 413, new social media postings being saved in the social network store 411 and other like changes. Unified activity feed component 440 can also reorder the presentation of the correlated data groupings 441 based upon the context of the user and the tasks in which the user is currently engaging. Thus, for example, if the user's context is determined to include their location as being in their office at work, then the unified activity feed 440 can present correlated data groupings related to work more highly then correlated data groupings related to leisure activities. Conversely, if the user's context is determined to include the user's location at home, than the unified activity feed 440 can present correlated data groupings related to leisure activities. As another example, if the user is at home, but is working on a presentation for their job, the unified activity feed component 440 can present correlated data groupings that comprise both work-related data groupings and leisure-related data groupings.

As part of the functionality of the unified activity feed component 440, the unified activity feed component 440 can utilize, or be a part of, the contracts/actions functionality 141 of the unified experience environment. Similarly, the support functionality 145 the unified experience environment can be utilized to support the various data stores from which the abstraction layer component 420 can obtain data.

Figure 4B:
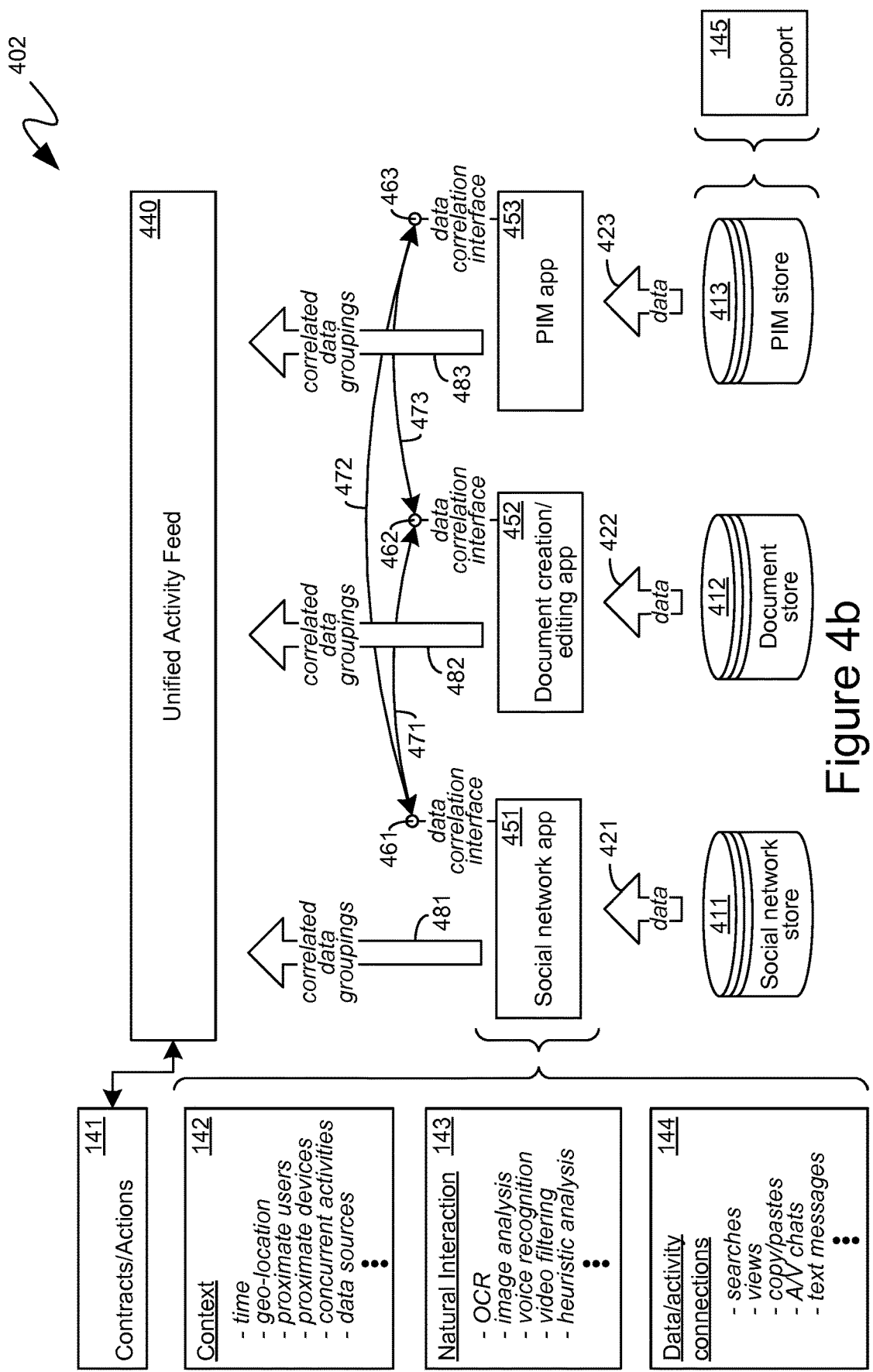

Turning to FIG. 4b, the exemplary system 402 shown therein illustrates an alternative implementation by which a user can be provided with a unified activity. More specifically, the exemplary system 402 comprises the data 421, from the social network store 411, being consumed by a dedicated social networking application, such as the exemplary social networking application 451. Similarly, the data 422, from the document store 412, can be consumed by a dedicated document creation/editing application 452, and the data 423 from the personal information manager store 413 can be consumed by a dedicated personal information manager application 453. Thus, to the extent that the data 421, 422 and 423 is being consumed by applications for 451, 452 and 453, respectively, that are dedicated applications directed to the consumption of such data, the exemplary system 402 represents an existing, fractured, data consumption paradigm.

In one embodiment, however, one or more of the various applications can comprise data correlation interfaces, such as the exemplary data correlation interfaces 461, 462 and 463, which can enable those applications to obtain data from other applications and, thereby, independently generate correlated data groupings, such as exemplary correlated data groupings 481, 482 and 483. More specifically, in one embodiment, individual applications, such as the social network application 451, the document creation/editing application 452 and the personal information manager application 453 can initially correlate the data 421, 422 and 423, respectively, associated with such application programs, into one or more correlated data groupings, such as exemplary correlated data groupings 481, 482 and 483. Subsequently, in such an embodiment, individual applications, such as the social network application 451, the document creation/editing application 452 and the personal information manager application 453, can utilize data correlation interfaces to request additional data from others of the individual applications. For example, as illustrated by the communication 471, the social network application 451 can transmit a request to the document creation/editing application 452, via the data correlation interface 462 thereof, requesting that the document creation/editing application 452 provide, to the social network application 451, via the data correlation interface 461 thereof, documents from the documents store 412 that are part of the correlated data groupings 481 generated by the social network application 451 from the data 421 from the social network store 411. Analogously, as also represented by the communication 471, the document creation/editing application 452 can transmit the corresponding request, to the social network application 451, via the data correlation interface 461 thereof, requesting that the social network application 451 provide, to the document creation/editing application 452, via the data correlation interface 462 thereof, social network information, such as postings, photos, messages and other like social network information that are part of the correlated data groupings 482 generated by the document creation/editing application 452 from the data 422 from the document store 412. In a similar manner, as illustrated by the communications 472 and 473, one or more of the individual applications can obtain, from the other applications, data that can be grouped with the correlated data groupings generated by an individual application program from data to which such an application program is natively directed.

In such a manner, individual application programs, such as the social network application 451, the document creation/editing application 452 and the personal information manager application 453, can perform the correlation and data grouping functionality described above with reference to the correlation engine 430 shown in FIG. 4a. Additionally, because each individual application program is, at least initially, operating on its native data, abstraction layer component 420 may not be necessary. As such, and as illustrated by the exemplary system 402 of FIG. 4b, various individual application programs, such as the social network application 451, the document creation/editing application 452 and the personal information manager application 453, can make use of the context functionality 142, the natural interaction functionality 143 and the data/activity connections functionality 144 provided by the unified experience environment, such as in the manner described in detail above.

In one embodiment, as illustrated by the exemplary system 402 of FIG. 4b, each of the individual applications can provide to their correlated data groupings, such as the exemplary correlated data groupings 481, 482 and 483, to the unified activity feed component 440, whose operation was described in detail above. In such an embodiment, unified activity feed component 440 can prioritize, organize and present and amalgamated set of the correlated data groupings from the individual correlated data groupings 481, 482 and 483 provided by the individual application programs. In an alternative embodiment, such a prioritization and organization of correlated data groupings can be performed prior to the presentation thereof to the unified activity feed component 440. For example, communications analogous to the communications 471, 472 and 473 can be exchanged among the individual applications to enable the individual applications to perform such prioritization and organization, and then provide a unified collection of correlated data groupings to the unified activity feed 440.

Figure 5:
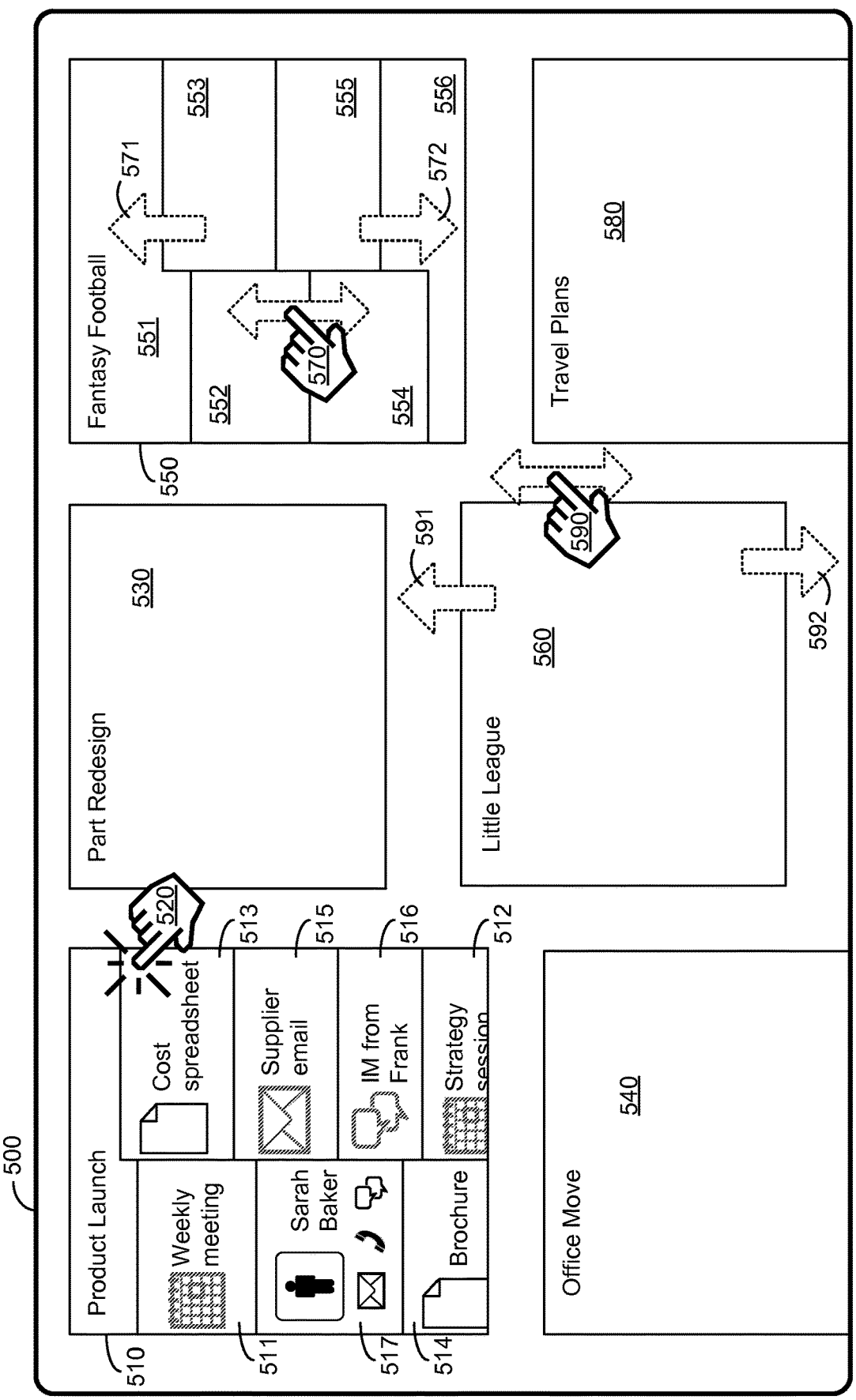
FIG. 5 is a diagram of another exemplary user interface providing unified presentation of contextually connected information.

Turning to FIG. 5, exemplary user interface 500 shown therein illustrates one exemplary embodiments by which a unified activity feed can be presented to a user. As illustrated by the exemplary user interface 500, various groupings or collections, such as the collections 510, 530, 540, 550, 560 and 580, can be visually presented to a user such that each of the collections is presented as a separate, distinct visual element encompassing a defined visual area. In one embodiment, the most relevant collections to the user's current task or current context can be presented at the top of the exemplary user interface 500, while other collections can be presented lower down in the exemplary user interface 500, or, may not yet be visible and can require scrolling. For example, the exemplary scroll motion 590 can result in the visually oriented collections appearing to move up or down, as illustrated by the arrows 591 and 592. In such a manner, the user can be presented with multiple collections of data through a "infinite scroll" paradigm where continually lower relevance collections require increasingly greater scrolling downward in order to make them visible within the exemplary user interface 500. Additionally, or alternatively, the user interface 500 can provide for selection mechanisms, including the displaying and selecting of additional content within a collection, or and the displaying and selection of additional collections themselves, that is amenable to computing devices having non-traditional user interfaces, such as television or media center computing devices, game console computing devices, in-car computing devices, and wearable computing devices, such as smartwatch computing devices and eyeglasses-based computing devices.

In an analogous manner, each individual collection such as, for example, the collection 550, can be scrolled within such a collection such that individual elements of data are brought into view. For example, the exemplary scroll motion 570 can result in the tiles 551, 552, 553, 554, 555 and 556 visually moving up or down so that other tiles either above or below exemplary tiles 551, 552, 553, 554, 555 and 556 can be displayed, as illustrated by the arrows 571 and 572.

As described previously, the collections of data can represent associated and correlated data including, for example, documents, entities, meetings, emails, text messages, individuals, photographs, search histories, and any other data. In one embodiment, the previously described mechanisms can automatically generate titles for the collections of data, tags or labels for individual entries in the collections of data, or combinations thereof. In an alternative embodiment, a user can be provided with the opportunity to enter or modify such titles, tags, labels or the like to better suit the user's needs.

The visual presentation of the individual data presented within a collection can, such as in the embodiment illustrated by the exemplary user interface 500, utilize a tile motif. Thus, for example, the exemplary collection 510 can include a tiles 511 and 512, which can be representative of meetings, tiles 513 and 514, which can be representative of documents, tile 515, which can be representative of an email, tile 516, which can be representative of an instant message communication session, tile 517, which can be representative of an individual, and other like tiles.

In one embodiment, to access any of the data presented, the user can direct a user action, such as an exemplary click or touch, selection, or other activation action 520, to a tile representative of data the user desires to access, and an appropriate application program can be automatically selected and invoked to, for example, view, manipulate or consume the data. In such a manner, the exemplary user interface 500 can be a primary user interface presented to a user, such as through a display device communicationally coupled to the computing device the user is currently using, because the user no longer has a need to maintain a hierarchical file organization, nor does the user have a need to directly access application programs.

As described previously, the unified activity feed, such as that illustrated in the exemplary user interface 500 of FIG. 5, can be dynamic such that the ordering of collections, such as the exemplary collections 510, 530, 540, 550, 560 and 580, can be reordered and represented in different orientations and locations depending upon activity within those collections, as well as the user's current context. Similarly, tiles representative of data within a collection can, likewise, be reordered and presented in different orientations and locations depending upon the relevance to such a collection and the user's current context. For example, if a user selects tiles representative of documents that are presented at the bottom of a collection, and ignores those presented at the top of a collection, the collection can be dynamically resorted such that the documents the user is likely to select next can be visually presented near the top of the collection. In such a manner user scrolling can be minimized, since the goal can be to proactively present to the user an ordering that does not require the user to scroll often to find the content they seek.

A unified activity feed can also modify its visual appearance and presentation to the user in accordance with the user's context. For example, if the user's location is in a car, then a mobile computing device to which the user is presented with a unified activity feed can present a simplified unified activity feed that, for example, presents only one collection at a time, as opposed to the multiple collections presented within the exemplary user interface 500 of FIG. 5. Distinction can also be made, in such an example, between a driver and a passenger in the car, and a driver can have a more appropriate interface vector selected for interfacing with the driver, such as, for example, exclusively utilizing a speech interface, as opposed to a visual interface that could distract the driver. Similarly, although not specifically illustrated in the exemplary user interface 500 of FIG. 5, notifications can be presented via tiles in collections or other like notification paradigms, which can also take into account the context of the user and the ordering of the collections being presented in the unified activity feed. For example, if the unified activity feed is being presented in a manner consistent with the user's context at work, then work-based notifications, such as, for example, a notification that one of the elevators is not working, can be presented to the user. Predictive aspects of the user's context can also inform which notifications are presented to the user. Thus, for example, if a user's context is at work, but the user's calendar indicates a family event commencing in one hour and traffic conditions exist that will likely increase the user's commute time to approximately one hour, then a notification can be proactively presented informing the user of such traffic conditions, and suggesting that the user leave very shortly in order to not be late for the family event. As another example, if the unified activity feed is being presented in a manner consistent with the user's context at home, then such work-based notifications need not be presented, and, instead, notifications relevance to, for example, the user's social life can be presented.

In such a manner, unified activity feed can provide a singular point of reference through which the user can access their digital data in a task-focused manner. Moreover, by automatically organizing the user's digital life into collections, the user's computing devices can act as true "personal assistants".

Figure 6:
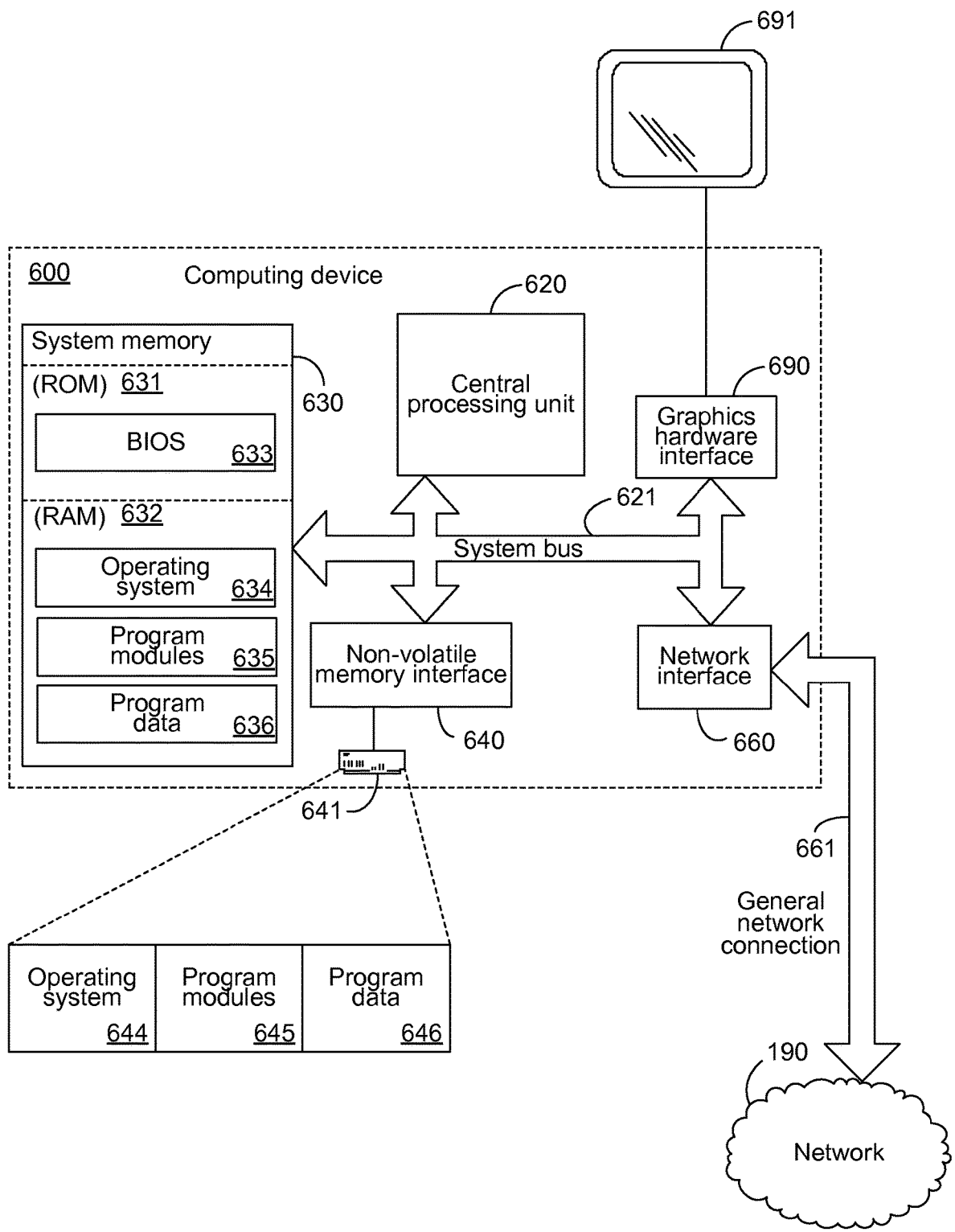
FIG. 6 is a block diagram of an exemplary computing device.

Turning to FIG. 6, an exemplary computing device 600 is illustrated. The exemplary computing device 600 can be any one or more of the computing devices referenced above. The exemplary computing device 600 of FIG. 6 can include, but is not limited to, one or more central processing units (CPUs) 620, a system memory 630, that can include RAM 632, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, such as for the display of graphical user interfaces, including, but not limited to, a graphics hardware interface 690 and a physical display device 691, which can include physical display devices capable of receiving touch-based user input, such as a touch-sensitive, or multi-touch capable, display device. Depending on the specific physical implementation, one or more of the CPUs 620, the system memory 630 and other components of the computing device 600 can be physically co-located, such as on a single chip. In such a case, some or all of the system bus 621 can be nothing more than silicon pathways within a single chip structure and its illustration in FIG. 6 can be nothing more than notational convenience for the purpose of illustration.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 600. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and the aforementioned RAM 632. A basic input/output system 633 (BIOS), containing the basic routines that help to transfer information between elements within computing device 600, such as during start-up, is typically stored in ROM 631. RAM 632 typically contains data and/or program modules that are immediately accessible to and/or presently being operated on by processing unit 620. By way of example, and not limitation, FIG. 6 illustrates the operating system 634 along with other program modules 635, and program data 636.

The computing device 600 may also include other removable/non-removable, volatile/nonvolatile computer storage media. By way of example only, FIG. 6 illustrates the hard disk drive 641 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media, as defined and delineated above. The hard disk drive 641 is typically connected to the system bus 621 through a non-removable memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 can operate in a networked environment using logical connections to one or more remote computers. The computing device 600 is illustrated as being connected to the general network connection 661 through a network interface or adapter 660, which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 661. It will be appreciated that the network connections shown are exemplary and other means of establishing a communications link between computing devices may be used.

Although described as a single physical device, the exemplary computing device 600 can be a virtual computing device, in which case the functionality of the above-described physical components, such as the CPU 620, the system memory 630, the network interface 660, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 500 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The preceding description provides details regarding multiple mechanisms that can be implemented in an interrelated manner, or can be implemented independently of one another. Without excluding any of the mechanisms described in detail above, the foregoing enumerations are directed to particular ones of those mechanisms:

A method for generating contextual metadata comprising: detecting the generation of a set of data for which a corresponding contextual metadata is to be generated; obtaining ambient data comprising at least one of: one or more users proximate to a computing device generating the set of data, one or more devices proximate to a computing device generating the set of data, and one or more concurrent activities being performed concurrently with the generating the set of data; generating at least a portion of the corresponding contextual metadata based upon the obtained ambient data.

A method for providing contextually relevant data comprising: detecting an accessing of a set of data having corresponding contextual metadata; identifying relationships between the corresponding contextual metadata and at least one other set of contextual metadata; obtaining at least one other set of data corresponding to the at least one other set of contextual metadata; and providing the obtained at least one other set of data in response to the detecting the accessing of the set of data.

A method for generating correlated data groupings comprising: obtaining data from multiple data stores, wherein each data store comprises an independent data format; abstracting the obtained data to comprise both the obtained data and additional data in a unified format; selecting a first one of the obtained data; determining, based on the first one of the obtained data and additional data in the unified format generated by abstracting the first one of the obtained data whether the selected first one of the obtained data is to be correlated with an existing data grouping; and correlating the selected first one of the obtained data with the existing data grouping or correlating the selected first one of the obtained data with a new data grouping based on the determining.

A method for generating correlated data groupings comprising: obtaining data from a first data store; selecting a first one of the obtained data; determining, based on the first one of the obtained data, whether the selected first one of the obtained data is to be correlated with an existing data grouping; correlating the selected first one of the obtained data with the existing data grouping or correlating the selected first one of the obtained data with a new data grouping based on the determining; obtaining, through an interface with an independently executing application program, additional data for at least one of: the existing data grouping or the new data grouping, the additional data being from a second data store different from, and independent of, the first data store.

For purposes of explicitly reciting various aspects of the above-described mechanisms, the descriptions above include, as a first example, a system for improving a user's efficiency, and increasing the user's interaction performance, with the system, through the presentation of contextually connected information, the system comprising: one or more processing units; a display device communicationally coupled to the one or more processing units; and one or more computer-readable storage media communicationally coupled to the one or more processing units, the one or more computer-readable storage media comprising computer-executable instructions, which, when executed by the one or more processing units, cause the system to perform steps comprising: detecting the user's accessing, via the system, of a first data that has a first contextual metadata corresponding to it, the first contextual metadata identifying prior contexts of the user that are associated with the first data; identifying a relationship between the first contextual metadata and a second, different contextual metadata; obtaining a second data to which the second contextual metadata corresponds, the second data being different than the first data; and physically generating, on the display device, a graphical user interface comprising: a primary content area comprising a display of at least a portion of the first data; and a context panel visually adjacent to the primary content area, the context panel comprising a first user interface element that is indicative of the obtained second data and that is user-selectable to access the obtained second data.

A second example is the system of the first example, wherein the graphical user interface further comprises a second user interface element, the second user interface element being displayed within the graphical user interface externally to, but visually connected, to the context panel; and wherein further the computer-readable media comprise further computer-executable instructions, which, when executed by the one or more processing units, cause the system to perform further steps comprising: detecting user action directed to the second user interface element; and, in response to the detecting, variously displaying or hiding the context panel within the graphical user interface.

A third example is the system of the first example, wherein the first user interface element comprises a tile comprising a textual identification of the obtained second data and a graphical icon representative of the obtained second data.

A fourth example is the system of the first example, wherein content of the context panel is user-modifiable; and wherein further the computer-readable media comprise further computer-executable instructions, which, when executed by the one or more processing units, cause the system to perform further steps comprising: detecting a user action comprising a drag action from the primary content area to the context panel; and updating the graphical user interface to comprise an updated context panel now comprising second user interface element that is indicative of the first data.

A fifth example is the system of the first example, wherein the second data is a document and the first user interface element is a graphical icon representative of the document; and wherein further the computer-readable media comprise further computer-executable instructions, which, when executed by the one or more processing units, cause the system to perform further steps comprising: detecting a user action directed to the graphical icon; accessing, in response to the detected user action, the second data; and updating the graphical user interface to comprise an updated primary content area now comprising a display of at least a portion of the document.

A sixth example is the system of the first example, wherein the second data references a person and the first user interface element comprises graphical icons representative of communication options for communicating with the person; and wherein further the computer-readable media comprise further computer-executable instructions, which, when executed by the one or more processing units, cause the system to perform further steps comprising: detecting a user action directed to one of the graphical icons; and initiating, in response to the detected user action, via the system, a communication with the person, the initiated communication corresponding to the one of the graphical icons to which the detected user action was directed.

A seventh example is the system of the first example, wherein the second data references an action performable by the system; and wherein further the computer-readable media comprise further computer-executable instructions, which, when executed by the one or more processing units, cause the system to perform further steps comprising: detecting a user action directed to the first user interface element; and initiating, in response to the detected user action, the action performable by the system that is referenced by the second data.

An eighth example is the system of the first example, wherein the context panel is automatically displayed within the graphical user interface based on a current time or a current location of the user.

A ninth example is the system of the first example, wherein the relationship between the first contextual metadata and the second contextual metadata is identified based on equivalencies or similarities between the first contextual metadata and the second contextual metadata.

A tenth example is the system of the first example, wherein the first contextual metadata comprises ambient data of prior user accesses of the first data.

An eleventh example is the system of the first example, wherein the computer-readable media comprise further computer-executable instructions, which, when executed by the one or more processing units, cause the system to perform further steps comprising: physically generating, on the display device, a second graphical user interface prior to the detecting, the second graphical user interface comprising: a unified activity feed comprising: a first distinct visual element representing a first grouping of correlated data, the first distinct visual element encompassing a defined visual area and being distinct from other visual elements representing other groupings of correlated data, the first distinct visual element having displayed within it elements comprising: a second user interface element that is indicative of a third data; and a third user interface element that is indicative of a fourth data, differing from the third data, the third user interface element being visually adjacent to the second user interface element within the first distinct visual element; wherein the third and fourth data are correlated with one another; and a second distinct visual element representing a second, different grouping of correlated data, the second distinct visual element also encompassing a defined visual area and being distinct from other visual elements representing other groupings of correlated data, including the first distinct visual element, the second distinct visual element having displayed within it elements comprising: a fourth user interface element that is indicative of a fifth data, differing from the third and fourth data; and a fifth user interface element that is indicative of a sixth data, differing from the third, fourth and fifth data, the fifth user interface element being visually adjacent to the fourth user interface element within the second distinct visual element; wherein the fourth and fifth data are correlated with one another; and wherein the first distinct visual element and the second distinct visual element are adjacent to one another within the unified activity feed.

A twelfth example is the system of the eleventh example, wherein the computer-readable media comprise further computer-executable instructions, which, when executed by the one or more processing units, cause the system to perform further steps comprising: detecting user action directed to scrolling the unified activity feed; updating the second graphical user interface, in response to the detecting the user action directed to scrolling the unified activity feed, such that the first distinct visual element and the second distinct visual element together move in response to the scrolling of the unified activity feed; detecting user action directed to scrolling within the first distinct visual element; and updating the second graphical user interface, in response to the detecting the user action directed to scrolling within the first distinct visual element, such that the second user interface element and the third user interface element together move within the first distinct visual element, exclusive of movement of the distinct visual elements in the unified activity feed and exclusive of movement of individual user interface elements in other distinct visual elements, in response to the scrolling within the first distinct visual element.

A thirteenth example is the system of the eleventh example, wherein the computer-readable media comprise further computer-executable instructions, which, when executed by the one or more processing units, cause the system to perform further steps comprising: determining a current context of the user; ranking the third or fourth data as more relevant to the determined current context of the user than the fifth or sixth data; visually arranging, in response to the ranking, the first distinct visual element above the second distinct visual element within the unified activity feed; and repeating the determining the current context of the user, the ranking and the visually arranging as the current context of the user changes.

A fourteenth example is a graphical user interface for improving a user's efficiency, and increasing the user's interaction performance, with a computing device physically generating the graphical user interface on a physical display device communicationally coupled to the computing device, the graphical user interface comprising: a primary content area comprising a display of at least a portion of a first data accessed by the user with the computing device; and a context panel visually adjacent to the primary content area, the context panel comprising a first user interface element that is indicative of a second data and that is user-selectable to access the second data; wherein the second data has a second contextual metadata corresponding to it, the second contextual metadata having an identified relationship with a first contextual metadata that corresponds with the first data that was accessed by the user.

A fifteenth example is the graphical user interface of the fourteenth example, further comprising a second user interface element, the second user interface element being displayed within the graphical user interface externally to, but visually connected, to the context panel, the second user interface element being user actionable to trigger displaying or hiding the context panel within the graphical user interface.

A sixteenth example is the graphical user interface of the fourteenth example, wherein the first user interface element comprises a tile comprising a textual identification of the obtained second data and a graphical icon representative of the obtained second data.

A seventeenth example is the graphical user interface of the fourteenth example, wherein the second data is either a document or the second data references a person or an action performable by the computing device; and wherein further the context panel further comprises a second user interface element that is indicative of a third data that differs in type from the second data and also is either a document or references a person or an action performable by the computing device.

An eighteenth example is a graphical user interface for improving a user's efficiency, and increasing the user's interaction performance, with a computing device physically generating the graphical user interface on a physical display device communicationally coupled to the computing device, the graphical user interface comprising: a unified activity feed comprising: a first distinct visual element representing a first grouping of correlated data, the first distinct visual element encompassing a defined visual area and being distinct from other visual elements representing other groupings of correlated data, the first distinct visual element having displayed within it elements comprising: a first user interface element that is indicative of a first data; and a second user interface element that is indicative of a second data, differing from the first data, the second user interface element being visually adjacent to the first user interface element within the first distinct visual element; wherein the first and second data are correlated with one another; and a second distinct visual element representing a second, different grouping of correlated data, the second distinct visual element also encompassing a defined visual area and being distinct from other visual elements representing other groupings of correlated data, including the first distinct visual element, the second distinct visual element having displayed within it elements comprising: a third user interface element that is indicative of a third data, differing from the first and second data; and a fourth user interface element that is indicative of a fourth data, differing from the first, second and third data, the fourth user interface element being visually adjacent to the third user interface element within the second distinct visual element; wherein the third and fourth data are correlated with one another; and wherein the first distinct visual element and the second distinct visual element are adjacent to one another within the unified activity feed.

A nineteenth example is the graphical user interface of the eighteenth example, wherein the unified activity feed is scrollable by a user of the computing device separately from scrolling by the user within the first distinct visual element or the second distinct visual element; wherein further scrolling the activity feed causes visual movement, within the graphical user interface, of both the first and second distinct visual elements together, while scrolling within the first distinct visual element causes the first and second user interface elements to visually move together within the first distinct visual element, exclusive of movement of the distinct visual elements in the unified activity feed and exclusive of movement of individual user interface elements in other distinct visual elements.

And a twentieth example is the graphical user interface of the eighteenth example, wherein a visual arrangement of distinct visual elements within the unified activity feed is in accordance with a determined relevance between a current context of the user and data indicated by user interface elements within those distinct visual elements, the visual arrangement being automatically updated as the current context of the user changes.

As can be seen from the above descriptions, mechanisms for increasing user efficiency and interaction performance through the unified presentation of contextually connected information have been described. In view of the many possible variations of the subject matter described herein, we claim as our invention all such embodiments as may come within the scope of the following claims and equivalents thereto.

We claim:

1. A method for presenting contextually connected information, the method comprising:
    accessing, by a first application executing on a computing device, a first data that has a first contextual metadata corresponding to it, the first contextual metadata comprising ambient data indicative of activity that occurred coincidentally with creation or editing of the first data;
    transmitting, by the first application, a request to a data correlation interface of a second application also executing on the computing device, the request providing the first contextual metadata;
    searching, by the second application, in response to receiving the request via the data correlation interface of the second application, other contextual metadata to identify a relationship between the first contextual metadata and a second, different contextual metadata, the identifying the relationship being based at least in part on existing, established data correlations;
    obtaining, by the second application, a second data to which the second contextual metadata corresponds;
    physically generating, by the computing device on a display device communicationally coupled to the computing device, a graphical user interface comprising:
        a primary content area comprising a display of at least a portion of the first data; and
        a context panel visually adjacent to the primary content area, the context panel comprising a first user interface element that is indicative of the second data, the first user interface element being user-selectable to access the second data;
    detecting a user action comprising a drag action from the primary content area to the context panel;
    generating, in response to the detecting, an explicit association between the first data and the second data, the explicit association now being one of the established data correlations; and
    updating the graphical user interface to comprise an updated context panel now comprising a second user interface element that is indicative of the first data;
    wherein the first application is a dedicated application directed to the consumption of the first data and the second application is a dedicated application directed to the consumption of the second data, thereby resulting in a fractured data consumption paradigm.

2. The method of claim 1, further comprising:
    receiving, by a unified activity feed component executing on the computing device, a first correlated data grouping from the second application, the first correlated data grouping comprising the second data and the first data as correlated to the second data;
    wherein the context panel comprises user interface elements indicative of data correlated to the first data, the data correlated to the first data being selected by the unified activity feed.

3. The method of claim 2, further comprising:
    receiving, by the unified activity feed component, multiple separate correlated data groupings from multiple separate applications; and
    ranking, by the unified activity feed component, data that was identified by at least one of the second correlated data grouping or the multiple separate correlated data groupings as being correlated to the first data;
    wherein the context panel comprises user interface elements indicative of highest ranked, according to the ranking, data correlated to the first data.

4. One or more computer-readable storage media comprising computer-executable instructions for presenting contextually connected information, the computer-executable instructions, when executed by a computing device, causing the computing device to perform steps comprising:
    accessing, by a first application, a first data that has a first contextual metadata corresponding to it, the first contextual metadata comprising ambient data indicative of activity that occurred coincidentally with creation or editing of the first data;
    transmitting, by the first application, a request to a data correlation interface of a second application, the request providing the first contextual metadata;
    searching, by the second application, in response to receiving the request via the data correlation interface of the second application, other contextual metadata to identify a relationship between the first contextual metadata and a second, different contextual metadata, the identifying the relationship being based at least in part on existing, established data correlations;
    obtaining, by the second application, a second data to which the second contextual metadata corresponds;
    physically generating, on a display device communicationally coupled to the computing device, a graphical user interface comprising:
        a primary content area comprising a display of at least a portion of the first data; and
        a context panel visually adjacent to the primary content area, the context panel comprising a first user interface element that is indicative of the second data, the first user interface element being user-selectable to access the second data;
    detecting a user action comprising a drag action from the primary content area to the context panel;
    generating, in response to the detecting, an explicit association between the first data and the second data, the explicit association now being one of the established data correlations; and
    updating the graphical user interface to comprise an updated context panel now comprising a second user interface element that is indicative of the first data;
    wherein the first application is a dedicated application directed to the consumption of the first data and the second application is a dedicated application directed to the consumption of the second data, thereby resulting in a fractured data consumption paradigm.

5. A system for presenting contextually connected information, the system comprising:
    one or more processing units;
    a display device communicationally coupled to the one or more processing units; and one or more computer-readable storage media communicationally coupled to the one or more processing units, the one or more computer-readable storage media comprising computer-executable instructions, which, when executed by the one or more processing units, cause the system to perform steps comprising:

accessing, by a first application executing on the system, a first data that has a first contextual metadata corresponding to it, the first contextual metadata comprising ambient data indicative of activity that occurred coincidentally with creation or editing of the first data;

transmitting, by the first application, a request to a data correlation interface of a second application, the request providing the first contextual metadata;

searching, by the second application, in response to receiving the request via the data correlation interface of the second application, other contextual metadata to identify a relationship between the first contextual metadata and a second, different contextual metadata, the identifying the relationship being based at least in part on existing, established data correlations;

obtaining, by the second application, a second data to which the second contextual metadata corresponds;

physically generating, on the display device, a graphical user interface comprising:
  a primary content area comprising a display of at least a portion of the first data; and
  a context panel visually adjacent to the primary content area, the context panel comprising a first user interface element that is indicative of the second data, the first user interface element being user-selectable to access the second data;

detecting a user action comprising a drag action from the primary content area to the context panel;

generating, in response to the detecting, an explicit association between the first data and the second data, the explicit association now being one of the established data correlations; and updating the graphical user interface to comprise an updated context panel now comprising a second user interface element that is indicative of the first data;

wherein the first application is a dedicated application directed to the consumption of the first data and the second application is a dedicated application directed to the consumption of the second data, thereby resulting in a fractured data consumption paradigm.

6. The system of claim 5, wherein the graphical user interface further comprises a third user interface element, the third user interface element being displayed within the graphical user interface externally to, but visually connected, to the context panel; and wherein further the computer-readable media comprise further computer-executable instructions, which, when executed by the one or more processing units, cause the system to perform further steps comprising: detecting user action directed to the third user interface element; and, in response to the detecting, variously displaying or hiding the context panel within the graphical user interface.

7. The system of claim 5, wherein the first user interface element comprises a tile comprising a textual identification of the second data and a graphical icon representative of the second data.

8. The system of claim 5, wherein the second data is a document and the first user interface element is a graphical icon representative of the document; and wherein further the computer-readable media comprise further computer-executable instructions, which, when executed by the one or more processing units, cause the system to perform further steps comprising:
  detecting a user action directed to the graphical icon;
  accessing, in response to the detected user action, the second data; and
  updating the graphical user interface to comprise an updated primary content area now comprising a display of at least a portion of the document.

9. The system of claim 5, wherein the second data references an action performable by the system; and wherein further the computer-readable media comprise further computer-executable instructions, which, when executed by the one or more processing units, cause the system to perform further steps comprising: detecting a user action directed to the first user interface element; and initiating, in response to the detected user action, the action performable by the system that is referenced by the second data.

10. The system of claim 5, wherein the context panel is automatically displayed within the graphical user interface based on a current time or a current location of the user.

11. The system of claim 5, wherein the computer-readable media comprise further computer-executable instructions, which, when executed by the one or more processing units, cause the system to perform further steps comprising:
  physically generating, on the display device, a second graphical user interface prior to the accessing, the second graphical user interface comprising:
    a unified activity feed comprising multiple distinct visual elements visually separated from each other by space, each distinct visual element being surrounded by the space, the multiple distinct visual elements comprising:
      a first distinct visual element;
      a second distinct visual element visually positioned horizontally adjacent to the first distinct visual element; and
      a third distinct visual element visually positioned vertically adjacent to the first distinct visual element;
      wherein each distinct visual element represents a distinct grouping of correlated data, each distinct visual element comprising multiple tile interface elements, the multiple tile interface elements comprising:
        a first tile interface element;
        a second tile interface element visually positioned horizontally adjacent to the first tile interface element; and
        a third tile interface element visually positioned vertically adjacent to the first tile interface element;
      wherein at least some of the tile interface elements comprise action icons.

12. The system of claim 11, wherein the computer-readable media comprise further computer-executable instructions, which, when executed by the one or more processing units, cause the system to perform further steps comprising:
  detecting user action directed to scrolling the unified activity feed;
  updating the second graphical user interface, in response to the detecting the user action directed to scrolling the unified activity feed, such that all of the multiple distinct visual elements together move in response to the scrolling of the unified activity feed;

detecting user action directed to scrolling within a first distinct visual element; and updating the second graphical user interface, in response to the detecting the user action directed to scrolling within the first distinct visual element, such that the multiple tile interface elements of the first distinct visual element together move within the first distinct visual element, exclusive of movement of others of the multiple distinct visual elements in the unified activity feed and exclusive of movement of the multiple tile user interface elements in the others of the multiple distinct visual elements.

13. The system of claim 12, wherein the scrolling of the unified activity feed is in a same direction as the scrolling within the first distinct visual element.

14. The system of claim 11, wherein the computer-readable media comprise further computer-executable instructions, which, when executed by the one or more processing units, cause the system to perform further steps comprising:

determining a current context of the user;

visually arranging, in response to the ranking, the multiple distinct visual elements within the unified activity feed; and repeating the determining the current context of the user, the ranking and the visually arranging as the current context of the user changes.

15. The system of claim 5, wherein the computer-readable media comprise further computer-executable instructions, which, when executed by the one or more processing units, cause the system to perform further steps comprising:

receiving, by a unified activity feed component, a first correlated data grouping from the second application, the first correlated data grouping comprising the second data and the first data as correlated to the second data;

wherein the context panel comprises user interface elements indicative of data correlated to the first data, the data correlated to the first data being selected by the unified activity feed.

16. The system of claim 15, wherein the computer-readable media comprise further computer-executable instructions, which, when executed by the one or more processing units, cause the system to perform further steps comprising:

receiving, by the unified activity feed component, a second correlated data grouping from the first application, the second correlated data grouping differing from the first correlated data grouping.

17. The system of claim 15, wherein the computer-readable media comprise further computer-executable instructions, which, when executed by the one or more processing units, cause the system to perform further steps comprising:

receiving, by the unified activity feed component, multiple separate correlated data groupings from multiple separate applications; and ranking data that was identified by at least one of the second correlated data grouping or the multiple separate correlated data groupings as being correlated to the first data;

wherein the context panel comprises user interface elements indicative of highest ranked, according to the ranking, data correlated to the first data.

18. The system of claim 5, wherein a second user drag action directed to the first user interface element and proceeding to drag to the primary content area causes at least a portion of the second data to be inserted into the first data.

19. The system of claim 5, wherein the graphical user interface further comprises a second user interface element, the second user interface element being displayed within the graphical user interface externally to, but visually connected, to the context panel, the second user interface element being user actionable to trigger displaying or hiding the context panel within the graphical user interface.

\* \* \* \* \*